(12) United States Patent
Javault et al.

(10) Patent No.: US 11,237,563 B2
(45) Date of Patent: Feb. 1, 2022

(54) METHOD FOR ANALYZING INDIVIDUAL PLANTS IN AN AGRICULTURAL FIELD

(71) Applicant: FarmWise Labs, Inc., San Francisco, CA (US)

(72) Inventors: Michael Javault, San Francisco, CA (US); Pauline Canteneur, San Francisco, CA (US); Arthur Flajolet, San Francisco, CA (US); Sébastien Boyer, San Francisco, CA (US); Thomas Palomares, San Francisco, CA (US)

(73) Assignee: FarmWise Labs, Inc., San Francisco, CA (US)

( * ) Notice: Subject to any disclaimer, the term of this patent is extended or adjusted under 35 U.S.C. 154(b) by 0 days.

(21) Appl. No.: 17/100,773

(22) Filed: Nov. 20, 2020

(65) Prior Publication Data

US 2021/0144903 A1 May 20, 2021

Related U.S. Application Data

(60) Provisional application No. 62/938,026, filed on Nov. 20, 2019.

(51) Int. Cl.
*G06K 9/00* (2006.01)
*G05D 1/02* (2020.01)
(Continued)

(52) U.S. Cl.
CPC ......... *G05D 1/0219* (2013.01); *A01B 69/008* (2013.01); *A01C 21/005* (2013.01); *A01C 21/007* (2013.01); *A01D 46/30* (2013.01); *A01G 25/09* (2013.01); *A01G 25/167* (2013.01); *A01M 7/0042* (2013.01); *A01M 7/0089* (2013.01); *A01M 21/02* (2013.01);
(Continued)

(58) Field of Classification Search
None
See application file for complete search history.

(56) References Cited

U.S. PATENT DOCUMENTS

2017/0219711 A1* 8/2017 Redden .............. G01N 33/0098
2018/0153084 A1* 6/2018 Calleija ................. A01B 39/18
(Continued)

OTHER PUBLICATIONS

International Search Report issued in PCT/US20/61679 dated Mar. 10, 2021.

*Primary Examiner* — Wei Wen Yang
(74) *Attorney, Agent, or Firm* — Run8 Patent Group, LLC; Peter Miller; Alexander R. Flake

(57) ABSTRACT

A method includes: at an autonomous vehicle and during a first operating period, capturing a first set of images of a plant; calculating a location of the plant based on the first set of images; extracting an initial value of a plant metric of the plant based on the first set of images; predicting a predicted value of the plant metric of the plant at a time based on the initial value of the plant metric of the plant and a set of global condition data. The method also includes, at the autonomous vehicle and during a second operating period concurrent with the time: capturing a second set of images of the plant; identifying the plant based on the second set of images and the location of the plant; and executing an agricultural operation on the plant based on the predicted value of the plant metric.

18 Claims, 6 Drawing Sheets

(51) Int. Cl.
*A01B 69/04* (2006.01)
*G05D 1/00* (2006.01)
*A01D 46/30* (2006.01)
*G06T 7/70* (2017.01)
*A01C 21/00* (2006.01)
*A01G 25/09* (2006.01)
*A01G 25/16* (2006.01)
*A01M 7/00* (2006.01)
*A01M 21/02* (2006.01)
*G05B 19/4155* (2006.01)
*G06T 7/00* (2017.01)
*B60R 11/04* (2006.01)

(52) U.S. Cl.
CPC ....... *G05B 19/4155* (2013.01); *G05D 1/0088* (2013.01); *G05D 1/0246* (2013.01); *G06K 9/00657* (2013.01); *G06T 7/0012* (2013.01); *G06T 7/70* (2017.01); *B60R 11/04* (2013.01); *G05B 2219/45017* (2013.01); *G05D 2201/0201* (2013.01); *G06T 2207/30188* (2013.01)

(56) References Cited

U.S. PATENT DOCUMENTS

| | | |
|---|---|---|
| 2019/0050948 A1 | 2/2019 | Perry et al. |
| 2019/0064363 A1 | 2/2019 | Redden et al. |
| 2019/0150357 A1* | 5/2019 | Wu .................. A01C 21/00 |
| 2019/0239502 A1 | 8/2019 | Palomares et al. |
| 2020/0019777 A1* | 1/2020 | Gurzoni, Jr. ....... G06K 9/00697 |
| 2020/0375094 A1* | 12/2020 | Calleija ................ A01D 34/008 |
| 2021/0000006 A1* | 1/2021 | Ellaboudy ............ A01B 69/008 |

\* cited by examiner

METHOD FOR ANALYZING INDIVIDUAL PLANTS IN AN AGRICULTURAL FIELD

CROSS-REFERENCE TO RELATED APPLICATIONS

This application claims the benefit of U.S. Provisional Application No. 62/938,026, filed on 20 Nov. 2019, which is incorporated in its entirety by this reference.

TECHNICAL FIELD

This invention relates generally to the field of agriculture and more specifically to a new and useful method for analyzing and acting upon individual plants in the field of agriculture.

DESCRIPTION OF THE EMBODIMENTS

The following description of embodiments of the invention is not intended to limit the invention to these embodiments but rather to enable a person skilled in the art to make and use this invention. Variations, configurations, implementations, example implementations, and examples described herein are optional and are not exclusive to the variations, configurations, implementations, example implementations, and examples they describe. The invention described herein can include any and all permutations of these variations, configurations, implementations, example implementations, and examples.

1. First Method

Figure 1:
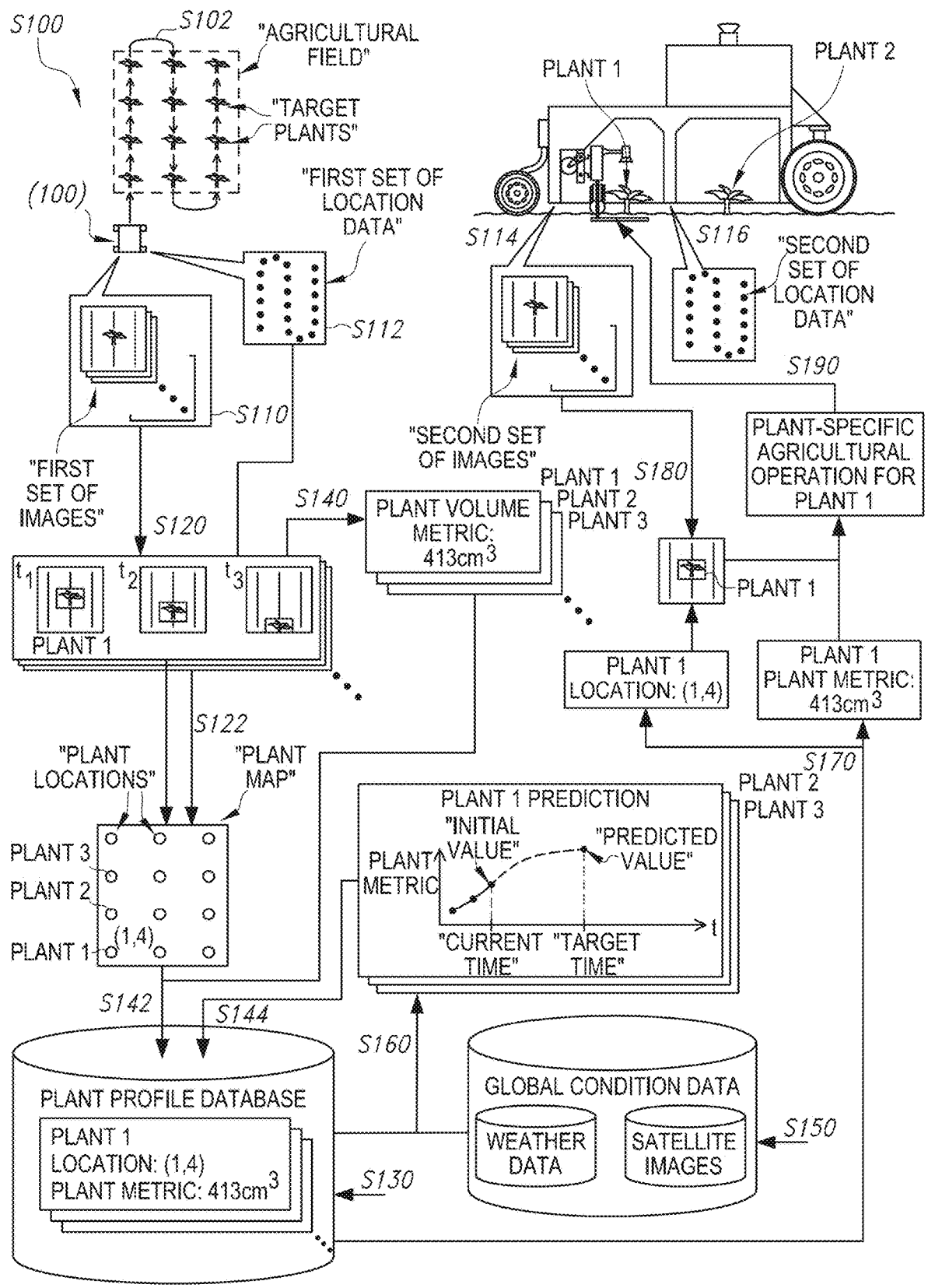
FIG. 1 is a flowchart representation of a first method.

As shown in FIG. 1, a method S100 includes, at an autonomous vehicle, during a first operating period: autonomously navigating within an agricultural field in Block S102; capturing a first set of images of a set of plants within the agricultural field in Block S110; and capturing a first set of location data of the autonomous vehicle in Block S112. The method S100 also includes, for each plant in the set of plants: detecting a position of the plant in the first set of images in Block S120; calculating a location of the plant based on the position of the plant in the first set of images and the first set of location data of the autonomous vehicle in Block S122; generating a plant profile of the plant in Block S130; extracting an initial value of a plant metric of the plant based on the first set of images in Block S140; and populating the plant profile of the plant with the location of the plant and the initial value of the plant metric of the plant in Block S142. The method S100 additionally includes accessing a set of global condition data associated with the agricultural field and captured during a target time interval between the first operating period and a target time in Block S150. The method S100 further includes, for each plant in the set of plants: predicting a predicted value of the plant metric of the plant at the target time based on the initial value of the plant metric of the plant and the set of global condition data in Block S160; and populating the plant profile of the plant with the predicted value of the plant metric of the plant associated with the target time in Block S144. The method S100 further includes, at the autonomous vehicle and during a second operating period concurrent with the target time: autonomously navigating within the agricultural field in Block S104; capturing a second set of images of the set of plants within the agricultural field in Block S114; and capturing a second set of location data of the autonomous vehicle in Block S116. The method S100 further includes, at the autonomous vehicle, during the second operating period concurrent with the target time, and for each plant in the set of plants: accessing the location of the plant and the predicted value of the plant metric of the plant from the plant profile of the plant in Block S170; identifying the plant based on the second set of images, the second set of location data, and the location of the plant in Block S180; and executing an agricultural operation on the plant based on the predicted value of the plant metric of the plant in Block S190.

As shown in FIG. 1, one variation of the method S100 includes, at an autonomous vehicle, during a first operating period: autonomously navigating within an agricultural field in Block S102; capturing a first set of images of a target plant within the agricultural field in Block S110; and capturing a first set of location data of the autonomous vehicle in Block S112. This variation of the method S100 also includes: calculating a location of the target plant based on a position of the target plant in the first set of images and the first set of location data of the autonomous vehicle in Block S122; generating a plant profile of the target plant in Block S130; extracting an initial value of a plant metric of the target plant based on the first set of images in Block S140; populating the plant profile of the target plant with the location of the target plant and the initial value of the plant metric of the target plant in Block S142; accessing a set of global condition data associated with the agricultural field and captured during a target time interval between the first operating period and a target time in Block S150; predicting a predicted value of the plant metric of the target plant at the target time based on the initial value of the plant metric of the plant and the set of global condition data in Block S160; and populating the plant profile of the target plant with the predicted value of the plant metric of the target plant associated with the target time in Block S144. This variation of the method S100 additionally includes, at the autonomous vehicle, during a second operating period concurrent with the target time: autonomously navigating within the agricultural field in Block S104; capturing a second set of images of the target plant within the agricultural field in Block S114; capturing a second set of location data of the autonomous vehicle in Block S116; accessing the location of the target plant and the predicted value of the plant metric of the target plant from the plant profile of the target plant in Block S170; identifying the target plant based on the second set of images, the second set of location data, and the location of the target plant in Block S180; and executing an agricultural operation on the plant based on the predicted value of the plant metric in Block S190.

As shown in FIG. 1, another variation of the method S100 includes, at an autonomous vehicle, during a first operating period: autonomously navigating within an agricultural field in Block S102; and capturing a first set of images of a target plant within the agricultural field in Block S110; calculating a location of the target plant based on a position of the target plant in the first set of images in Block S122; extracting an initial value of a plant metric of the target plant based on the first set of images in Block S140; predicting a predicted value of the plant metric of the target plant at a target time based on the initial value of the plant metric of the plant and a set of global condition data associated with the agricultural field and associated with a target time interval between the first operating period and a target time in Block S160. This variation of the method S100 also includes, at the autonomous vehicle, during a second operating period concurrent with the target time: autonomously navigating within the agricultural field in Block S14; capturing a second set of images of the target plant within the agricultural field in Block S114; identifying the target plant based on the second set of images and the location of the target plant in Block S180; and executing an agricultural operation on the target plant based on the predicted value of the plant metric in Block S190.

2. Second Method

Figure 2A:
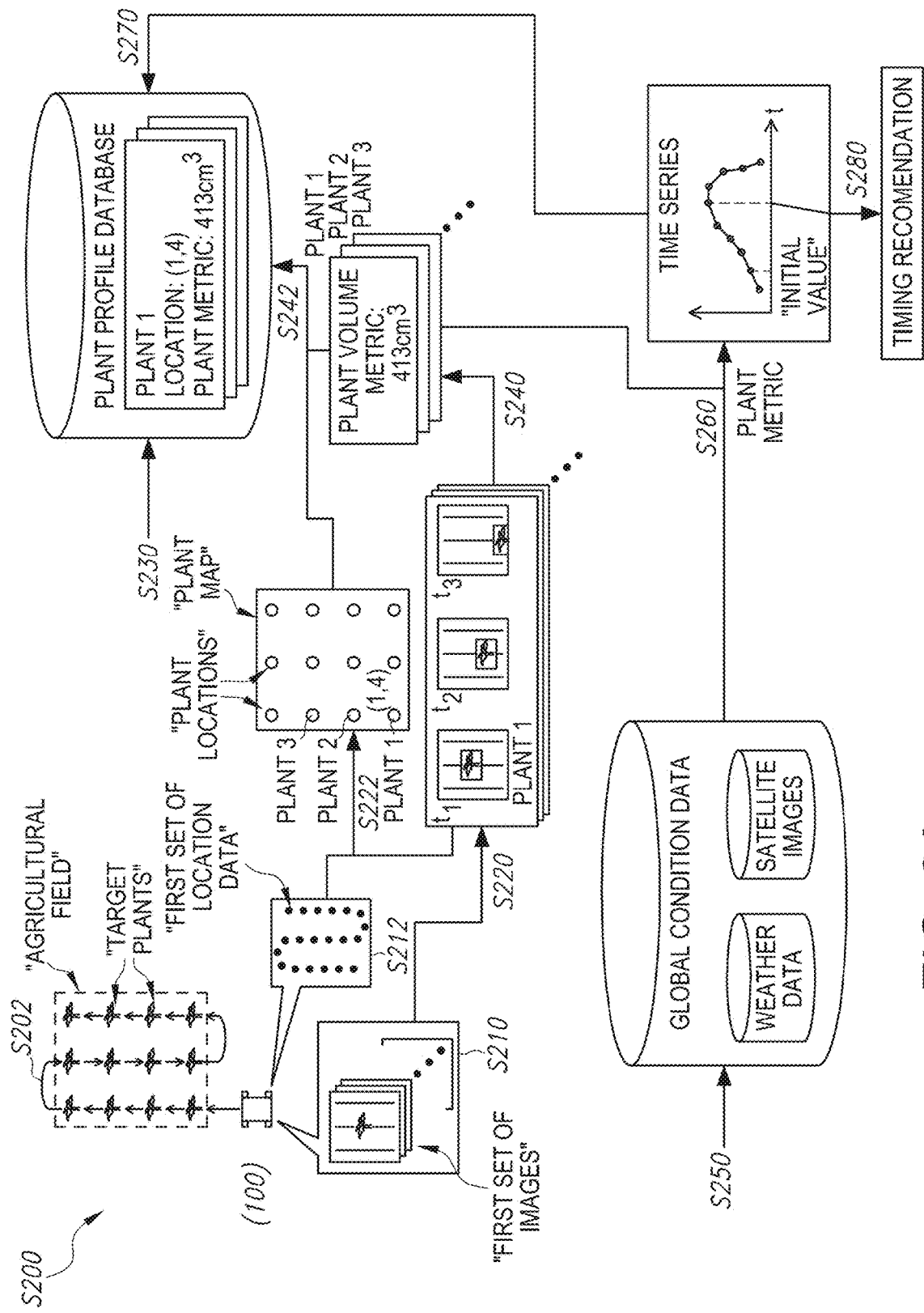
FIG. 2A is a flowchart representation of a second method.

As shown in FIG. 2A, the method S200 includes, at an autonomous vehicle, during a first operating period: autonomously navigating within an agricultural field in Block S202; capturing a first set of images of a set of plants within the agricultural field in Block S210; and capturing a first set of location data of the autonomous vehicle in Block S212. The method S200 also includes, for each plant in the set of plants: detecting a position of the plant in the first set of images in Block S220; calculating a location of the plant based on the position of the plant in the first set of images and the first set of location data of the autonomous vehicle in Block S222; generating a plant profile of the plant in Block S230; extracting an initial value of a plant metric of the plant based on the first set of images in Block S240; and populating the plant profile of the plant with the location of the plant and the initial value of the plant metric of the plant in Block S242. The method S200 additionally includes accessing a set of global condition data associated with the agricultural field in Block S250. The method S200 further includes, for each plant in the set of plants: predicting a time series of the plant metric of the plant based on the initial value of the plant metric of the plant and the set of global condition data in Block S260; and populating the plant profile of the plant with the time series of the plant metric of the plant in Block S270. The method S200 further includes generating a timing recommendation for an agricultural operation based on the plant profile of each plant in the set of plants, the timing recommendation designating a first target time in Block S280.

Figure 2B:
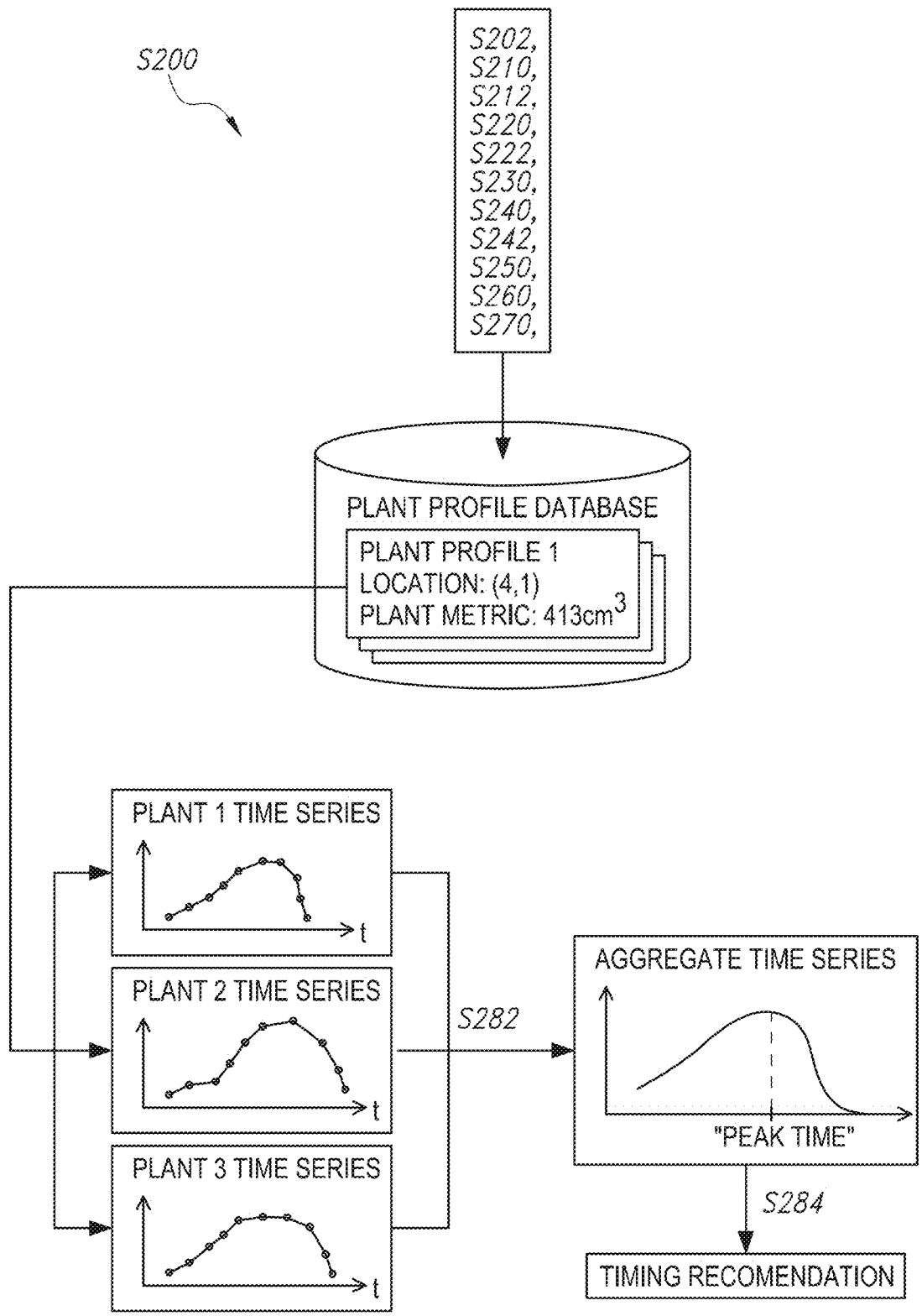
FIG. 2B is a flowchart representation of one variation of the second method.

As shown in FIG. 2B, one variation of the method S200 includes, at an autonomous vehicle, during a first operating period: autonomously navigating within an agricultural field in Block S202; capturing a first set of images of a set of plants within the agricultural field in Block S210; and capturing a first set of location data of the autonomous vehicle in Block S212. This variation of the method S200 also includes, for each plant in the set of plants: detecting a position of the plant in the first set of images in Block S220; calculating a location of the plant based on the position of the plant in the first set of images and the first set of location data of the autonomous vehicle in Block S222; generating a plant profile of the plant in Block S230; extracting an initial value of a plant metric of the plant based on the first set of images in Block S240; and populating the plant profile of the plant with the location of the plant and the initial value of the plant metric of the plant in Block S242. This variation of the method S200 additionally includes accessing a set of global condition data associated with the agricultural field in Block S250. This variation of the method S200 further includes, for each plant in the set of plants: predicting a time series of the plant metric of the plant based on the initial value of the plant metric of the plant and the set of global condition data in Block S260; and populating the plant profile of the plant with the time series of the plant metric of the plant in Block S270. This variation of the method S200 further includes aggregating the time series of the first plant metric of each plant in the set of plants to generate a time series of an aggregate first plant metric for the agricultural field in Block S282; identifying a first peak data point in the time series of the aggregate first plant metric, the first peak data point corresponding to a first peak time in Block S284; and generating a first timing recommendation for a first agricultural operation at the first peak time in Block S286.

Figure 2C:
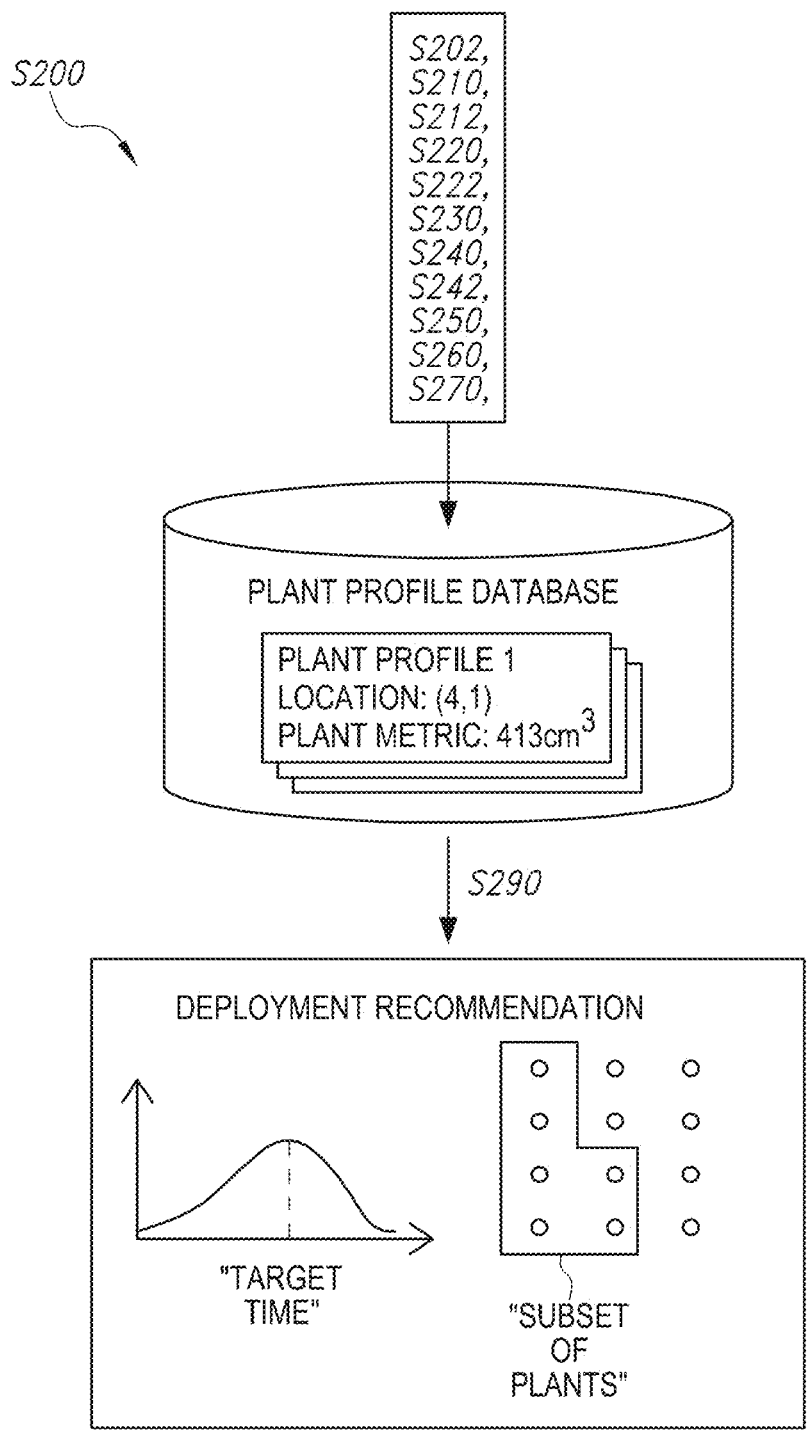
FIG. 2C is a flowchart representation of one variation of the second method.

As shown in FIG. 2C, one variation of the method S200 includes, at an autonomous vehicle, during a first operating period: autonomously navigating within an agricultural field in Block S202; capturing a first set of images of a set of plants within the agricultural field in Block S210; and capturing a first set of location data of the autonomous vehicle in Block S212. This variation of method S200 also includes, for each plant in the set of plants: detecting a position of the plant in the first set of images in Block S220; calculating a location of the plant based on the position of the plant in the first set of images and the first set of location data of the autonomous vehicle in Block S222; generating a plant profile of the plant in Block S230; extracting an initial value of a plant metric of the plant based on the first set of images in Block S240; and populating the plant profile of the plant with the location of the plant and the initial value of the plant metric of the plant in Block S242. This variation of the method S200 additionally includes accessing a set of global condition data associated with the agricultural field in Block S250. This variation of the method S200 further includes, for each plant in the set of plants: predicting a time series of the plant metric of the plant based on the initial value of the plant metric of the plant and the set of global condition data in Block S260; and populating the plant profile of the plant with the time series of the plant metric of the plant in Block S270. This variation of the method S200 further includes generating a deployment recommendation for an autonomous vehicle based on the plant profile of each plant in the set of plants, the deployment recommendation for the autonomous vehicle designating a target time for deployment of the autonomous vehicle and designating a subset of plants in the set of plants for an agricultural operation in Block S290.

3. Applications

Generally, the methods S100 and S200 can be executed by a remote computer system (hereinafter "the system") in cooperation with an autonomous agricultural vehicle (hereinafter the "autonomous vehicle") to: deploy the autonomous vehicle to autonomously navigate along crop rows of an agricultural field during a first operating period; access a set of images of a set of plants in the agricultural field captured by the autonomous vehicle during the first operating period; calculate a geospatial location of each plant in the set of plants based on the first set of images; extract individual, plant-specific metrics (hereinafter "plant metrics") for each plant in the set of plants; and store plant metrics of each plant in association with the location of the plant in the agricultural field in order to create a plant profile characterizing the plant.

Thus, the system, in cooperation with the autonomous vehicle, can maintain a plant profile (i.e., a plant-specific data repository) for each plant in the agricultural field, thereby enabling the autonomous vehicle to execute individualized agricultural operations—such as weeding, harvesting, seeding, fertilizing, watering, and pesticide dispensing—on each plant in the agricultural field. Additionally, the system can leverage the aforementioned plant profiles and associated condition data (e.g., satellite imagery, weather data, locally collected agricultural data) to generate a large set of training examples to train and execute machine learning models that can guide the temporal and spatial deployment of the autonomous vehicle to perform agricultural operations, thereby increasing agricultural yield. For example, the system can interpret needs of individual plants in the field—such as weeding, watering, pesticide application, or fertilizer application and magnitude and timing thereof—and redeploy the autonomous vehicle to serve these needs during a subsequent operating period at a later time (e.g., days or weeks later).

In order to populate plant profiles for an individual plant in an agricultural field, system can extract features from images depicting the individual plant and derive various plant metrics of the plant from these features, such as normalized difference vegetation index (hereinafter "NDVI"), approximate plant volume, approximate plant height, approximate plant maturity, approximate root diameter, approximate root depth, approximate water content etc. Additionally, the system can utilize soil probes and/or other sensors mounted to the autonomous vehicle to capture local condition data from the environment proximal to the individual plant such as the local soil nitrogen content; the local soil moisture content; and/or the local soil temperature. The system can then populate a plant profile of the individual plant with these plant metrics and local condition data and associate this plant profile with the detected location of the individual plant, such as: a relative position of the individual plant in a plant map of the agricultural field generated by the autonomous vehicle during the first operating period. Additionally or alternatively, the system can label a plant profile of the individual plant with a geospatial location and orientation of the autonomous vehicle when the image of the individual plant was recorded and an address of a camera in the autonomous vehicle that recorded the image.

The system can also record agricultural operations performed on this individual plant (e.g., performed by the autonomous vehicle or another agricultural systems operating in the agricultural field). Specifically, the system can record magnitudes of these agricultural operations and timestamps of these agricultural operations in the plant profile for this individual plant. For example, the system can record—to the plant profile—the times at which this individual plant was planted, weeded, watered, fertilized, sprayed with pesticide, etc. by the autonomous vehicle and/or other agricultural systems deployed to the agricultural field. The system can also record metrics relative to these actions, such as: a seed depth of the plant when first planted; amounts of water applied by the autonomous vehicle during watering cycles; amounts of pesticide applied by the autonomous vehicle during pesticide cycles; and/or weeding effectiveness characterized by presence of weeds near the individual plant immediately following weeding processes completed by the autonomous vehicle around the individual plant during weeding cycles.

Furthermore, the system can record timeseries of global condition data, which may be applicable to all plants of the agricultural field (e.g., a series of satellite images of the agricultural field, temperature timeseries data, rainfall timeseries data, humidity timeseries data representing environmental exposure of the agricultural field or agricultural region more generally) to the plant profile of the individual plant. The system can then correlate these local condition data and these global condition data from the plant profile of the individual plant with the plant metrics of the individual plant to generate high-temporal-resolution predictions of the state of the individual plant in the agricultural field at any target time independent of the time elapsed since a most recent deployment of the autonomous vehicle. For example, the system can estimate the approximate plant volume of the individual plant based on a week of satellite images of the agricultural field and a week of weather data relevant to the agricultural field without having deployed the autonomous vehicle to directly observe the individual plant during that week. Additionally, the system can predict values of a plant metric of the individual plant in the agricultural field in the future based on current global condition data and the most recent directly observed value of the plant metric of the individual plant.

Thus, the system can record a comprehensive state of an individual plant in the agricultural field and timeseries of agricultural operations, environmental exposure, and other events affecting the individual plant over a lifetime of the individual plant. The system can also: interpolate between discrete states of the individual plant captured by the autonomous vehicle when deployed to the agricultural field to execute an agricultural operation (e.g., once per two-week interval); extrapolate (or predict) future states of the individual plant based on its past states; and predict upcoming needs of the individual plant in order to maintain viability, quality, and growth of the individual plant based on these predicted future states of the individual plant.

The system can execute this process for each individual plant in the agricultural field based on images and other data recorded by the autonomous vehicle and/or other agricultural equipment deployed to the agricultural field over time to predict upcoming needs of each plant in the agricultural field. The system can then schedule subsequent agricultural operations at the agricultural field generally and calculate magnitudes of the agricultural operations and/or secondary agricultural operations for each individual plant accordingly.

For example, the system can schedule redeployment of the autonomous vehicle to perform agricultural operations—such as weeding, watering, fertilizing, pesticide dispensing, or harvesting—based on the plant profile of the individual plant and/or forecasted environmental data for the agricultural region. For example, the system can calculate the relative exposure of plants in the agricultural field to high temperature (e.g., greater than a threshold temperature), by monitoring the local soil temperature data proximal to each plant, and can schedule watering times and/or watering volume for each individual plant in the agricultural field based on the exposure level of each individual plant. Thus, the system can greatly improve resource efficiency and yield by tailoring agricultural operations—that would otherwise be performed as a bulk operation (e.g., providing the same volume of water to each plant in the agricultural field)—to the individual needs of plants in an agricultural field.

In one variation, the system 100 can also perform individualized agricultural operations based on images of an individual plant recorded during the same operating period (e.g., without redeployment of the autonomous vehicle). In this variation, the system can: access a plant profile of a target plant; identify this target plant based on a plant map of the agricultural field; record an image of the target plant; select an agricultural operation and magnitude for the target plant based on the image of the target plant and the plant profile of the target plant; and execute the selected operation on the target plant.

The method S100 is described herein as being performed by a remote computer system. However, some or all Blocks of the method S100 can be performed by the autonomous vehicle and/or a local computer (e.g., located on site or at the autonomous vehicle).

4. Autonomous Vehicle

Figure 4:
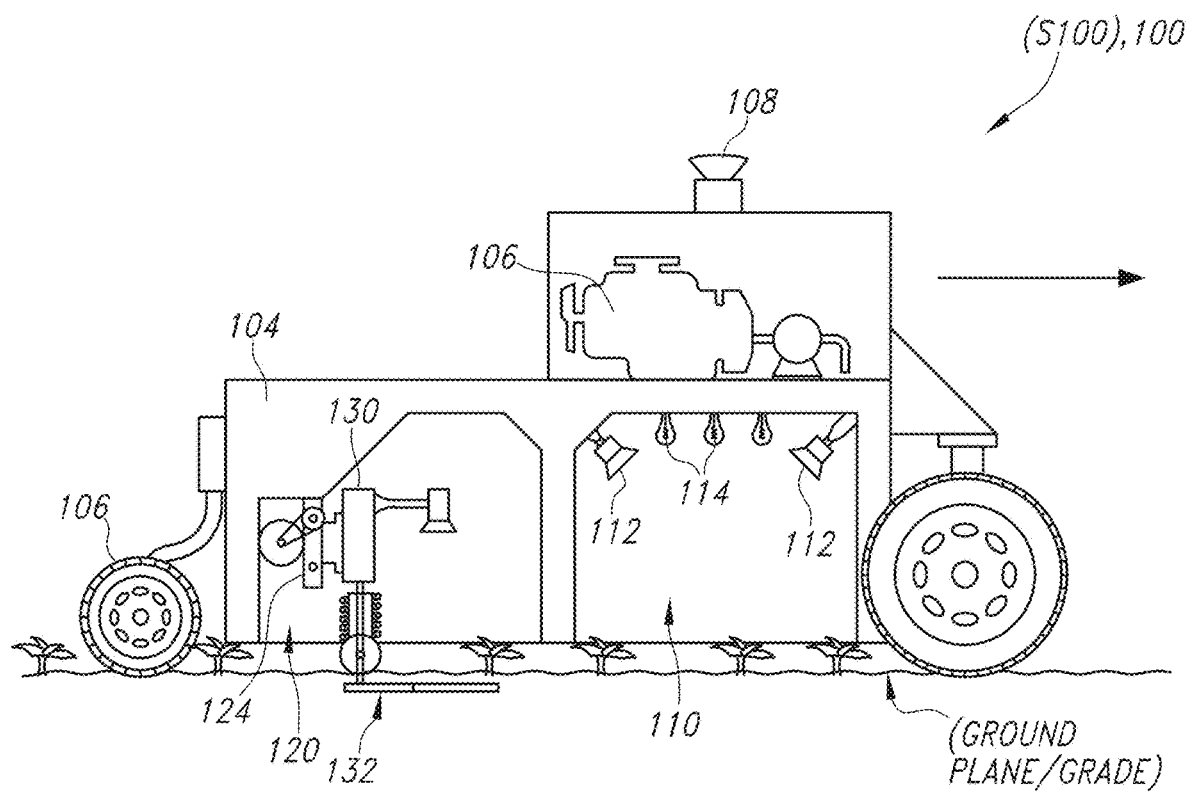
FIG. 4 is a schematic representation of an autonomous vehicle.

As shown in FIG. 4, the autonomous vehicle is configured to autonomously navigate through an agricultural field while detecting target plants in the agricultural field and executing agricultural operations (e.g., weeding, harvesting, watering, fertilizer application, pesticide application) on or around these target plants.

In one implementation, the autonomous vehicle defines a wheeled or tracked vehicle and includes a controller 102, a chassis 104, and a drive unit 106 configured to propel the autonomous vehicle forward. In this implementation, the controller 102 is configured to execute Blocks of the method S100 to adjust operational parameters and to selectively prompt a remote operator to control or verify operation of the autonomous vehicle. The autonomous vehicle can also include: geospatial position sensors 108 configured to detect the autonomous vehicle's location within a geospatial coordinate system; an inertial measurement unit configured to output values representing the autonomous vehicle's trajectory; outwardly facing color and/or depth sensors (e.g., color cameras, LIDAR sensors, and/or structured light cameras, etc.) configured to output images of the autonomous vehicle's environment; and a wireless communication module configured to broadcast video feeds from these cameras and requests for assistance to a remote operator portal and to receive feedback from a remote operator. The controller can thus implement computer vision and/or other artificial intelligence techniques to: detect nearby obstacles, localize itself within a scene, and/or contextualize a nearby scene based on objects detected in video feeds recorded by these cameras; elect next actions based on these objects and scenes; and adjust positions of various actuators within the autonomous vehicle accordingly during autonomous operation at an agricultural field.

4.1 Light Module

The autonomous vehicle can also include a light module no (e.g., arranged near a front end of the autonomous vehicle). The light module 110: can include a set of front cameras 12; can define an enclosed volume with a downward-facing opening spanning one or more crop rows traversed by the autonomous vehicle during operation on an agricultural field; and can block external light from reaching a ground area below, which may over-expose images recorded by the front facing cameras. For example, the light module 110 can include retractable or flexible shades (i.e. flaps) that substantially block external ambient light from illuminating the area enclosed within the light module no. The light module no can also include controllable lighting elements 114 configured to repeatably illuminate a ground area directly under the opening of the light module no.

4.2 Tool Housing

The autonomous vehicle can also include a tool housing 120 arranged behind the light module no and configured to house a set of tool modules. In one implementation, the tool housing 120 defines a downward-facing opening and forms a volume sufficiently large to enclose the set of tool modules while allowing for lateral adjustment of the tool modules, such as to reconfigure the autonomous vehicle for operation on different agricultural fields planted with different crop row configurations. In particular, a tool module loaded into the tool housing 120 can include an end effector that extends downward toward a ground area below the autonomous vehicle to execute agricultural operations on or near target plants below.

In one implementation, the tool housing 120 includes a toolbar extending laterally across the tool housing and configured to transiently receive a set of tool modules 130. For example, the toolbar can span a width of two meters, and a set of three, four, or five tool modules can be arranged on the toolbar based on crop row spacing at a particular field to which the autonomous vehicle is currently deployed. In this example, to autonomously weed a field around planted crops (i.e., "target plants"), a set of four weeding modules can be loaded onto the toolbar; as the autonomous vehicle passes over a field of crops, the controller can independently control each of these weeding modules to weed around target plants in four crop rows below.

At another time, to water these crops, a field technician may replace the weeding modules with watering modules connected to a water reservoir installed in the autonomous vehicle. As the autonomous vehicle navigates along rows of crops on an agricultural field, the autonomous vehicle can selectively and independently trigger spray valves in each of these watering modules 130 to open in order to selectively dispense water onto target plants in crop rows below.

Similarly, to fertilize these crops, the agricultural field technician may replace the watering modules 130 with fertilizing modules connected to a common fertilizer reservoir installed in the autonomous vehicle. As the autonomous vehicle navigates along rows of crops in an agricultural field, the autonomous vehicle can selectively and independently trigger valves in each of these fertilizing modules 130 to open in order to selectively dispense fertilizer onto target plants in crop rows below.

The autonomous vehicle can also include a set of toolbar actuators configured to raise and lower ends of the toolbar, thereby decreasing and increasing depths of tool modules installed on the toolbar, accordingly. Additionally or alternatively, the toolbar actuators can be configured to apply controllable amounts of pressure onto the ends of the toolbar, thereby adjusting pressures applied by installed tool modules (e.g., by wheels or rollers installed on bottoms ends of tool modules) onto crop rows below, and thus controlling tool depth and ground control for tool modules loaded onto the toolbar.

Additionally or alternatively, the autonomous vehicle can be loaded with tool modules 130 including integrated depth adjustment and/or integrated pressure adjustment actuators.

In another implementation, the tool housing includes a set of tool receptacles 124, each including a fixed or independently-actuatable toolbar configured to transiently receive a tool module. In this implementation, to prepare the autonomous vehicle to autonomously weed a field of crops, each tool receptacle 124 in the autonomous vehicle can be loaded with a tool module. As the autonomous vehicle passes over a set of crop rows in an agricultural field, the autonomous vehicle can independently control these tool receptacles and corresponding tool modules in order to maintain alignment between these tool modules and corresponding crop rows below and to selectively perform agricultural operations around target plants in these crop rows.

4.3 Tool Modules

Generally, the autonomous vehicle can include a set of tool modules configured to engage with the toolbar, laterally align with target plants in the agricultural field, and execute specific agricultural operations on these target plants as the autonomous vehicle navigates within the agricultural field. More specifically, the autonomous machine can include a set of tool modules configured to execute a specific agricultural operation on target plants in the agricultural field such as a set of weeding modules, a set of harvesting modules, a set of fertilizing modules, a set of pesticide modules, a set of watering modules, a set of seeding modules etc.

Additionally, or alternatively, the autonomous vehicle can include a set of multifunctional tool modules configured to execute multiple types of agricultural operations on target plants within the agricultural field within a single deployment of the autonomous vehicle to the agricultural field. For example, the autonomous vehicle can be configured with a set of weeding modules and a set of watering modules, thereby enabling the autonomous vehicle to select a weeding operation and/or a watering operation to execute on target plants within the agricultural field. Thus, the autonomous vehicle can deploy to an agricultural field while transiently loaded with any combination of available tool modules in order to execute intended agricultural operations on target plants in the agricultural field.

In one implementation, the autonomous vehicle can include a single applicator tool module capable of dispensing water, pesticide, and/or fertilizer (i.e. any liquid loaded on to an onboard tank). The applicator tool module can include an end effector configured with an electromechanical nozzle configured to dispense any of the aforementioned liquids toward target plants in the agricultural field. Additionally, the applicator tool module can include an applicator arm configured to position the end effector relative to target plants in order to dispense liquid toward specific regions of target plants within the agricultural field.

In another implementation, the autonomous vehicle can include a harvesting module configured to harvest (i.e., remove from the agricultural field) specific target plants. The harvesting module can include electromechanical components specific to the particular species of the target plant. Thus, the autonomous vehicle can be configured with multiple types of harvesting modules based on the species of the target plant within the agricultural field.

4.3.1 Weeding Module

In one implementation, a tool receptacle in the tool housing is loaded with a weeding module. In this implementation, the weeding module can include a pair of primary blades and a blade actuator configured to transition the primary blades between open and closed positions. In this implementation, the primary blades: can define curved, cantilevered sections extending from driveshafts suspended from the tool receptacle; and submerged in topsoil, such as configured to run 0-60 millimeters below grade while the autonomous vehicle traverses an agricultural field in order to dislodge weeds from topsoil. The primary blades can also be geared or otherwise driven together by the blade actuator—such as an electromagnetic rotary motor or a pneumatic linear actuator—such that the primary blades open and close together.

In the closed position, tips of primary blades can come into contact or nearly into contact such that the primary blades form a continuous barricade across the width of the weeding module. The primary blades in the closed position can thus displace topsoil and tear weeds out of the topsoil across the full lateral span of the primary blades in the closed position. In this implementation, the pair of primary blades can also be vertically offset relative to one another, thereby enabling the tips of the blades to overlap to ensure a continuous barricade across the width of the weeding module in the closed position.

However, when opened by the blade actuator, tips of the primary blades spread apart, thereby forming a "gap" between the tips of the primary blades. The blade actuator can therefore transition the primary blades to the open position in order to form a gap between the primary blades: sufficient to fully clear the stalk of a target plant passing under the weeding module; sufficient to minimally disrupt topsoil around the target plant; but sufficiently closed to dislodge other non-target plants (e.g., weeds) immediately adjacent the target plant from the topsoil as the autonomous vehicle autonomously navigates past the target plant.

In one implementation, the blade actuator is configured to retain the primary blades in the closed position by default such that the primary blades displace topsoil and tear weeds out of the topsoil across the full lateral span of the primary blades as the autonomous vehicle navigates along a crop row. However, in this example, upon nearing a target plant, the autonomous vehicle can trigger the blade actuator to open the primary blades by the nominal blade gap width to permit the target plant to pass through the weeding module substantially undisturbed. Once the target plant passes the weeding module, the autonomous vehicle can trigger the blade actuator to return to the closed position, thereby closing the "gap" just behind the stalk of the plant and disrupting weeds growing on the back side of the target plant.

4.4 Cameras

The autonomous vehicle can also include a set of cameras (or other optical sensors) arranged inside the light module 110 and inside the tool housing 120 and configured to record images of ground areas passing under the light module 110 and the tool housing 120 as the autonomous vehicle autonomously navigates along crop rows within an agricultural field.

4.4.1 Front Camera

In one implementation, the autonomous vehicle includes a front camera 112 (e.g., a high-resolution, high-speed RGB camera or multi-spectral imager) arranged in the light module 110, defining a field of view spanning all or a portion of the opening of the light module no, and configured to record images (or "entry images") of ground areas entering the light module no from the front of the autonomous vehicle (i.e., ground areas that the autonomous vehicle is navigating over). The autonomous vehicle can then analyze these entry images to detect and distinguish "target plants" from weeds, to calculate positions of stalks of target plants with a relatively high degree of accuracy and repeatability, and/or to extract qualities of these target plants (e.g., plant age, plant size, pest presence, fertilizer burns, nutrient or water deficiency, etc.).

In one implementation, the autonomous vehicle includes multiple front cameras 112 arranged in the light module no. For example, the autonomous vehicle can include one front camera 112 arranged over each crop row spanned by the light module no, wherein each front camera 112 is configured to record images of a single crop row. In this example, the autonomous vehicle can process images from these front cameras 112 independently and control individual tool modules trailing these front cameras 112 accordingly. In another example, the autonomous vehicle includes two or more cameras arranged in the light module no and defining fields of view that span multiple (e.g., two or three) crop rows. The autonomous vehicle can then: process images output by these cameras independently; or stitch discrete, concurrent images recorded by these cameras into a composite image of the ground area spanned by the light module no. The autonomous vehicle can then process these individual images or this composite image: to detect plants passing under the light module; to distinguish target plants from other plants (e.g., weeds); to estimate stalk positions (e.g., centroids leaf areas) of these target plants; to calculate lateral offsets between the trajectory of each tool module and the stalk of a target plant in the corresponding crop row; and to calculate longitudinal distance offsets between each tool module and the stalk of a target plant in the corresponding crop row (or to calculate a temporal offset between a tool module and the corresponding target plant based on a current velocity of the autonomous vehicle). Accordingly, the autonomous vehicle can drive each tool module to the lateral offset position of the next target plant in its corresponding crop row as the autonomous vehicle continues to navigate forward; and the autonomous vehicle can trigger each tool module to execute an agricultural operation once the autonomous vehicle can traverse the corresponding longitudinal distance offset.

Therefore, the autonomous vehicle can detect target plants in "entry images" recorded by a set of front cameras arranged proximal the front of the autonomous vehicle, and the autonomous vehicle can then adjust lateral positions and selectively trigger tool modules to execute actions based on lateral and longitudinal positions of target plants detected in these entry images.

However, the autonomous vehicle can include any configuration of front cameras 112.

4.4.2 Feedback Cameras

The autonomous vehicle can also include a set of feedback cameras 136 arranged behind the light module, such as in the tool housing 120 or just ahead of the tool modules. For example, the autonomous vehicle can include one feedback camera coupled to each tool receptacle 124 in the tool housing 120, wherein each feedback camera faces downward to define a field of view that includes an end effector of a tool module loaded into its corresponding tool receptacle 124 (or that includes a reference feature connected to the end effector and extending above the soil when the end effector is submerged in soil, as described below). In another example, a feedback camera is integrated into, coupled to, or arranged over each tool module installed in the tool housing, wherein each feedback camera faces downward to define a field of view that includes the end effector of its corresponding tool module.

Each feedback camera 136 can thus record image data representing interactions between its corresponding tool module and plants passing under this tool module. In particular, a feedback camera 136 can record images (hereinafter "feedback images") of interactions between an end effector—of a corresponding tool module loaded into the tool housing 120—and plants passing under the autonomous vehicle. As described below, the autonomous vehicle can analyze a series of feedback images recorded by a feedback camera 136 to characterize interactions between the tool module and a series of target plants traversed by the tool module as the tool module executes an action on these target plants.

However, the autonomous vehicle can include any configuration of feedback cameras 136.

4.4.3 Hyperspectral Cameras and 3D Cameras

In one implementation, the autonomous vehicle can include front cameras, feedback cameras, or additional cameras positioned in the light module of the autonomous vehicle or within the tool module of the autonomous vehicle configured to record images outside of the visible spectrum. Thus, via the inclusion of hyperspectral cameras, the autonomous vehicle can capture images of the target plants outside of the visible spectrum. For example, the autonomous vehicle can include an infrared camera to detect thermographic images of the plant bed surface to better identify the location of the stem of a plant. In another example, the autonomous vehicle can include a near-infrared camera (or a hyperspectral camera configured to image the near-infrared band of the spectrum) in order to calculate NDVI or a normalized difference red edge vegetation index (hereinafter "NDRE").

In another implementation, the autonomous vehicle can include 3D cameras (e.g., structured light cameras, LIDAR) in order to record 3D images of target plants in the agriculture field in order to better estimate plant height, plant volume, plant leaf structure, or any other structural characteristic of a target plant. Deployment and Setup In one implementation, to deploy the autonomous vehicle to an agricultural field to execute an agricultural operation, a user, field operator, or remote operator generates a work order for the autonomous vehicle through a work order interface, such as executing in a native application or web browser at a mobile or local computing device.

For example, to initialize a new work order, the work order interface can render a geospatial map of a geographic region and prompt the user (or field operator, remote operator) to: enter a set of (e.g., three or more) geospatial coordinates defining a boundary of an agricultural field; select a set of geospatial waypoints defining the boundary of the agricultural field on the geospatial map; or select a predefined area representing the agricultural field in the geospatial map. The work order interface (or a remote computer system) can thus define waypoints, vertices, and/or a boundary around the agricultural field accordingly. The work order interface can then prompt the user (or field operator, remote operator) to enter: a plant species (butter lettuce, Yukon potato, soybean) of the crop planted on the agricultural field; a plant maturity (e.g., an age or heading stage) of the crop; and an agricultural operation for the agricultural field. The work order interface (or a remote computer system) can then compile these data and the location of the agricultural field into a work order and schedule delivery of the autonomous vehicle to this agricultural field to execute the agricultural operation accordingly.

A field operator may then: deliver and unload the autonomous vehicle to the agricultural field or to a road (e.g., a service road) nearby; (re)fuel the autonomous vehicle; load a set of tool modules (e.g., weeding tools) for the agricultural operation specified in the work order into the tool module(s) in the autonomous vehicle; adjust lateral spacing of the tool modules according to crop row space of the agricultural field; and then depart the agricultural field (e.g., to deliver a second autonomous vehicle to another agricultural field).

The autonomous vehicle (and/or the remote computer system) can then autonomously navigate toward a start point on the agricultural field and initialize nominal parameters for executing the agricultural operation via these tool modules based on other data stored in the work order.

5. Initial Autonomous Operation

Generally, the autonomous vehicle can, during an operating period: autonomously navigate along crop rows of an agricultural field in Blocks S102 and S202; capture a set of images of a set of plants within the agricultural field in Blocks S110 and S210; and capture a set of location data representing the geospatial location of the autonomous vehicle in the agricultural field. Additionally, during autonomous operation of the autonomous vehicle, the autonomous vehicle can capture timestamps in association with each captured image and captured location data point such that the system can construct a plant map from the set of images captured by the autonomous vehicle.

Prior to executing these Blocks of the method S100, the autonomous vehicle can autonomously navigate toward a start point (e.g., a first waypoint) in the agricultural field, such as at a nearest corner of the agricultural field. While approaching the start point at the agricultural field, the autonomous vehicle can detect a first set of crop rows in an image feed output by a forward-mounted, outwardly-facing optical sensor (e.g., a color camera, a LIDAR sensor) arranged on the autonomous vehicle and align the longitudinal axis of the autonomous vehicle to the crop rows. As the autonomous vehicle approaches a proximal end of the first set of crops rows on the agricultural field, the autonomous vehicle can: detect a first row of target plants in these crop rows with the outwardly-facing optical sensor; and execute smaller lateral adjustments to refine its lateral alignment to these target plants. Upon achieving alignment with a crop row in the agricultural field, the autonomous vehicle can longitudinally advance along the crop row, thereby transitioning over the target plants in the crop row and enabling the autonomous vehicle to capture a set of images depicting the target plants in the crop row. Thus, the autonomous vehicle can record a set of images depicting target plants in the agricultural field as the autonomous vehicle progresses along crop rows in the agricultural field.

Generally, the autonomous vehicle can capture images with any of the above-described ground-facing cameras and/or image sensors at an imaging frequency that guarantees a minimum level of overlap between images (at the programmed velocity of the autonomous vehicle) such that the system can execute visual odometry techniques in order to construct the plant map from the set of images. Additionally, the autonomous vehicle, while navigating along crop rows of the agricultural field, can capture hyperspectral images, LIDAR point clouds, stereoscopic images, and/or any other image data with which the system can extract plant metrics or local condition data from the agricultural field.

While navigating along crop rows in the agricultural field, the autonomous vehicle can also capture location data of the autonomous vehicle pertaining to the autonomous vehicle's geospatial location and/or the autonomous vehicle's relative location within the agricultural field in Blocks S112 and S212. In one implementation, the autonomous vehicle can capture global location data in the form of global navigation satellite system (hereinafter "GNSS") coordinates or other localization technologies such that the system can calculate the location of the autonomous vehicle within the agricultural field at any given time during the operating period. Additionally or alternatively, the autonomous vehicle can capture relative location data such as encoder data representing the progression of the wheels and/or treads of the autonomous vehicle and/or inertial data from accelerometers and or gyroscopes of the autonomous vehicle indicating the motion of the autonomous vehicle in the agricultural field.

Thus, the system can: combine the set of images captured by the autonomous vehicle and the location data captured by the autonomous vehicle; execute visual odometry, inertial odometry, and/or dead reckoning techniques; and generate a plant map representing the location of each target plant in the agricultural field, as further described below.

In one implementation, as the autonomous vehicle passes over this first crop row of target plants, the autonomous vehicle can: detect the first row of target plants in a sequence of entry images recorded by the front camera(s); and laterally align the tool modules with corresponding target plants in this first column of target plants; and, in response to detecting lateral and longitudinal alignment of a tool module with a target plant, the autonomous vehicle can actuate the tool module to perform an agricultural operation on the target plant. Thus, as the autonomous vehicle autonomously navigates throughout the agricultural field, the autonomous vehicle records: a first set of images depicting each target plant in the agricultural field; and any plant relevant data from auxiliary sensor of the autonomous vehicle.

6. Plant Map Generation

Generally, the system can, for each plant in the set of plants within the agricultural field: detect a position of the plant in the set of images recorded by the autonomous vehicle in Blocks S120 and S220; and calculate a location of the plant based on the position of the plant in the set of images and the set of location data of the autonomous vehicle in Blocks S122 and S222. More specifically, the system can: detect centroids or stalk/stem locations of each plant in the agricultural field in the set of images and calculate the relative position of each plant based on overlapping images in the first set of images. Because the relative location of plants in an agricultural field is not uniform across fields (e.g., there are small variations in the longitudinal spacing and lateral alignment of plants in each crop row), the plant map, therefore, constitutes a uniquely identifying fingerprint for an agricultural field. Thus, upon subsequent deployments of the autonomous vehicle to an agricultural field, the autonomous vehicle can: generate an incomplete plant map, by recording images of the plant bed in real-time; and align this incomplete map with known plant maps in order to determine the position of the autonomous vehicle relative to the plant field. Once the autonomous vehicle localizes itself relative to a known plant map, the autonomous vehicle can additionally uniquely identify each plant in the agricultural field. Therefore, upon repeated execution of the method S100, the system can track the state of individual plants in the field and execute individualized agricultural operations on these plants.

The system can generate a plant map in real-time at the autonomous vehicle. In this implementation, the autonomous vehicle can sequentially process each image to determine a centroid of the target plant and continuously generate regions of the plant map as it autonomously navigates through an agricultural field.

For each target plant (e.g., the cultivated crop of the agricultural field) depicted in a set of images of the agricultural field, the autonomous vehicle 100 can implement computer vision techniques to: detect and extract features in the subset of images depicting the target plant (e.g., consecutive images recorded while the autonomous vehicle navigated over the plant); and to identify those features representing target plants, weeds, soil, or other non-target matter. For example, the autonomous vehicle 100 can implement template matching, object recognition, or other plant classifier or computer vision techniques to detect plant matter in the subset of images and/or to distinguish the target plant from weeds in each image in the set of images captured by the autonomous vehicle during initial deployment of the autonomous vehicle. The autonomous vehicle 100 can additionally or alternatively implement deep learning techniques (e.g., convolutional neural networks) to identify target plants in an entry image. Thus, the system can identify target plants in the agricultural field based on plant color(s), leaf shape, and/or size, etc.).

Once the autonomous vehicle 100 identifies a target plant in the subset of images, the autonomous vehicle 100 can also approximate or otherwise locate a stalk (or meristem) of the target plant. For example, the autonomous vehicle 100 can:

calculate a centroid of foliage of the target plant and associate this centroid as the location of the stalk of the first target plant. Once the autonomous vehicle 100 determines the location of the stalk of the first target plant relative to the autonomous vehicle (e.g., relative to the front camera of the autonomous vehicle), the autonomous vehicle can: utilize visual odometry to calculate the target plant's location relative to a previously scanned target plant; and store this location of the stalk of the target plant as a relative location of the target plant in the plant map. The autonomous vehicle can then repeat these steps as the autonomous vehicle passes over each target plant in the agricultural field in order to generate plant map for the whole agricultural field. Additionally or alternatively, the autonomous vehicle and/or the system can identify the stalk or meristem of target plants by training and/or executing a machine learning module such as a convolutional neural network as is further described below.

In an alternative implementation, the above steps can be executed by the system at a remote server connected to the autonomous vehicle over a local or wide area network. In this implementation, the autonomous vehicle can store a set of images depicting each crop row of the autonomous field before uploading this set of images to the remote server, which can then generate the plant map by executing the above steps as a batch process of the entire set of images recorded by the autonomous vehicle.

In one implementation, because the autonomous vehicle can perform a U-turn at the end of each crop row, there may be a discontinuity between crop rows in the plant map. Therefore, the system can store the plant map as a series of sections wherein each section represents one pass of the autonomous vehicle on the agricultural field.

In another implementation, the system can transform a plant map to a global plant map by calculating a precise GNSS location for any two points in the field in order to label the plant map with a global location and orientation. By generating a global plant map, the system can retrieve data pertaining to the region of the global plant and associate these data with each plant included in the global plant map.

6.1.1 Stalk Detection

In one implementation, the system can identify an exact stalk or meristem location (hereinafter "stalk location") in order to increase the accuracy and repeatability of the location estimate for the target plant, which may vary significantly over time as the target plant grows. For example, if the target plant begins to grow asymmetrically, the centroid of the plant may move relative to the stem of the target plant, thereby reducing the accuracy of a centroid-based location calculation. Therefore, instead of detecting the centroid of the target plant in an image and designating the centroid as the location of the target plant, the system can execute a machine learning model—such as a convolutional neural network—in order to identify the stalk location of the target plant based on an image of the target plant.

More specifically, the system can detect the position of a target plant in a set of images by: classifying the plant as a target plant species based on the set of images; identifying a stalk position of the plant based on the set of images and the target plant species; and calculating the location of the plant based on the stalk position of the plant in the first set of images and the first set of location data of the autonomous vehicle. Thus, the system can execute multiple different machine learning models trained for specific species of target plants such that, by executing each of these machine learning models, the system can identify the stalk location of the target plant.

In one implementation, the system can train the aforementioned stalk detection model based on a set of labeled training images of plants of the target plant species. In this implementation, each training example includes an image of a target plant and a marked pixel location in the image representing the stalk location of the target plant. The system can then execute supervised learning techniques on a convolutional neural network (or other machine learning model) in order to train the stalk detection model for execution on future images of target plants within the agricultural field.

7. Plant Profile

Figure 3:
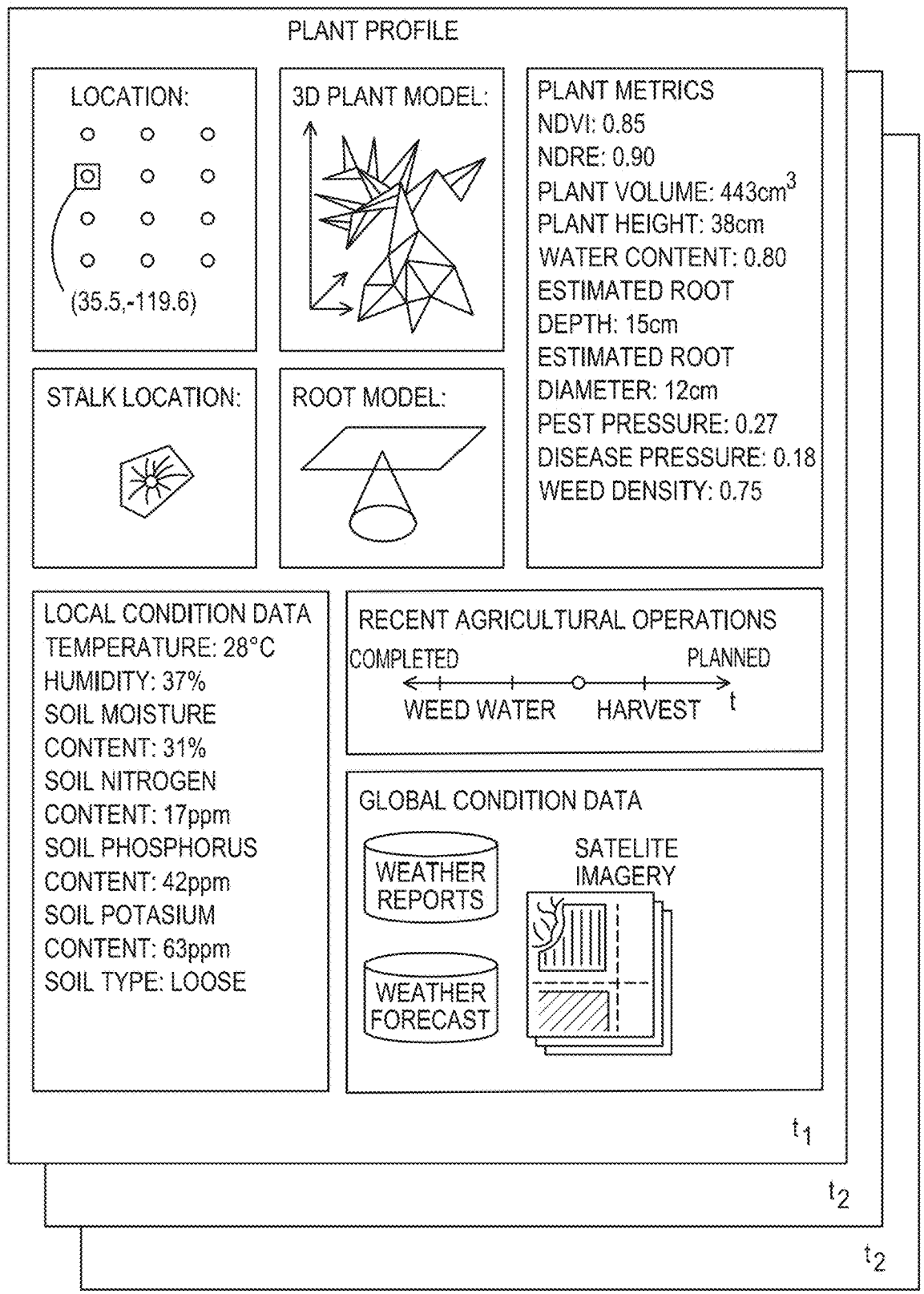
FIG. 3 is a schematic representation of a plant profile.

As shown in FIG. 3, once the system has generated a plant map, the system can associate each plant location in the plant map with an individual plant profile representing multiple plant metrics of the plant, local condition data relevant to the plant, and/or global condition application to each plant in the agricultural field in Blocks S130 and S230. More specifically, the system can generate a plant profile that can include plant metrics (e.g., NDVI, NDRE, plant volume plant height), local condition data captured near the location plant (e.g., soil moisture content, soil nitrogen content, soil temperature, air temperature, air humidity), 2D and/or 3D images of the plant, correlations between local condition data at the plant location and global condition data proximal to the location of the agricultural field or agricultural region, a list of agricultural operations performed on the target plant (e.g., by the autonomous vehicle or other entities), and/or global condition data relevant to the agricultural field. Additionally, the system can record timeseries of any of these plant-related attributes and associate these timeseries with a plant profile in order to track multiple aspects of the plant over the lifetime of the plant in the agricultural field. Thus, the system generates a plant profile that provides a record of the state of the plant itself as well as the environmental conditions around each plant.

In one implementation, upon calculating a location of a target plant in the agricultural field, the system can generate a plant profile for the target plant by storing the location of the target plant in association with a unique identifier of the target plant in a plant profile database, thereby generating a unique database entry representing the target plant. As the system extracts plant metrics, local condition data, and global condition data pertaining to this target plant, the system can continue to store these data in the existing plant profile database entry for the target plant. Additionally, the system can organize plant profiles in the plant profile database by crop row and/or by any regional designation categorically representing the location of the target plant within actionable regions of the agricultural field. Thus, during successive deployments of the autonomous vehicle, the system can designate particular crop rows or regions of the agricultural field for execution of recommended agricultural operations on whole subset of target plants, which may exhibit similar characteristics.

7.1 Plant Metrics

Generally, the system can, upon recording the first set of images of target plants and/or local condition data within the agricultural field: extract an initial value of a plant metric of the plant based on the first set of images in Blocks S140 and S240; and populate the plant profile of the plant with the location of the plant and the initial value of the plant metric of the plant in Blocks S142 and S242. Thus, the system can track multiple plant metrics that are relevant to plant health or plant yield for each target plant in the agricultural field and store these plant metrics in association with a plant profile of a plant.

For example, the system can calculate the NDVI, the NDRE, plant volume, and/or plant height of the target plant based on 2D and 3D hyperspectral images of the target plant. In order to calculate these plant metrics, the system can isolate the plant in the 2D and 3D images by excluding surrounding soil and/or other regions of the plant bed surface that the system has identified as not depicting the target plant. The system can then align these cropped 2D and 3D images of the target to generate a 3D model of the target plant thereby enabling the system to calculate more complex plant metrics for the target plant.

In one implementation, the system calculates an NDVI for a target plant based on a most recent cropped image of the target plant and can calculate a timeseries of NDVI values for a target plant by repeatedly imaging this plant over the lifetime of the target plant in the agricultural field. The system can likewise calculate the NDRE for the target plant. Because the autonomous vehicle can include a 3D camera separate from its hyperspectral camera (or even separate from its color camera), the system can align 2D images and 3D images recorded by the autonomous vehicle and project color (or other spectral data) recorded by the hyperspectral camera onto the 3D image of the target plant. Additionally or alternatively, the system can calculate an NDVI or NDRE based on the spectral reflectance over the surface area of the 3D image of the target plant.

In yet another implementation, the system can evaluate machine learning models on 2D and/or 3D images of the target plant to identify features of the target plant such as individual leaves, fruit, flowers, etc. The system can then track these features as a component of a plant profile. For example, the system can calculate a number of fruit being produced by a target plant and track this statistic over time.

However, the system can extract additional plant metrics from the set of images and local condition data as is further described below.

7.1.1 Three-Dimensional Modelling

Generally, the system can fuse multiple 2D images and/or 3D images (e.g., LIDAR point clouds, structured light images) of a target plant recorded from differing perspectives by a camera or image sensor of the autonomous vehicle (e.g., as the autonomous vehicle navigates through the agricultural field) to generate a 3D representation of the target plant from which the system can calculate multiple secondary plant metrics, such as plant volume, plant height, approximate plant mass, or any other secondary metric derived from the 3D model.

In one implementation, the system can generate a three-dimensional model of a target plant based on the first set of images; and calculate a value of a plant volume metric of the plant based on the three-dimensional model of the plant. Upon calculating a plant volume metric for the target plant, the system can: populate the plant profile of the plant with the value of the plant volume metric of the target plant; predict a predicted value of the plant volume metric of the plant at a target time based on the initial value of the plant volume metric of the plant and a set of global condition data; and populate the plant profile of the plant with the predicted value of the plant volume metric of the plant associated with the target time; and execute an agricultural operation on the plant based on the predicted value of the plant volume metric.

In another implementation, the system calculates the height and volume of the target plant based on the 3D image of the target plant. In this implementation, the system can define a 3D bounding box or a 3D bounding region around the target plant and calculate an approximate position of the ground surface of the agricultural field. The system can then calculate the height from the top of the bounding box to the surface of the agricultural field as the height of the target plant. Additionally, the system can calculate the total volume of the bounding box in order to approximate the plant volume of the target plant.

7.1.2 Root Modelling

Generally, the system can extract plant metrics characterizing the root structure of target plants in the agricultural field in order to guide weeding and harvesting operations (and prevent impingement or other damage to the root structure of target plants during these operations). More specifically, the system can: estimate a plant maturity of the plant based on a target plant species and the set of images recorded by the autonomous vehicle; and calculate an initial value of a root diameter metric of the plant and an initial value of a root depth metric of the plant based on the plant maturity of the plant. Upon characterizing the root structure of the target plant according to an initial value of the root diameter metric (i.e., an approximate root diameter) and an initial value of the root depth metric (i.e., an approximate root depth), the system can: populate the plant profile of the target plant with the initial value of the root diameter metric and the initial value of the root depth metric; predict a predicted value of the root diameter metric of the plant at a target time based on the initial value of the root diameter metric of the plant and the set of global condition data; predict a predicted value of the root depth metric of the plant at the target time based on the initial value of the root depth metric of the plant and the set of global condition data; populate the plant profile of the plant with the predicted value of the root diameter metric of the plant associated with the target time; and populate the plant profile of the plant with the predicted value of the root depth metric of the plant associated with the target time, as is further described below.

In one implementation, the system can estimate the root diameter and/or root depth of a target plant by executing a root structure model (e.g., a machine learning model) that takes as input an image of a target plant and outputs an estimate of the root depth of the target plant and an estimate of the root diameter of the target plant. In this implementation, the system can access a set of training examples, each of which includes an above-ground image of a target plant in addition to measurements of the target plant's root depth and root diameter. The system can then execute supervised learning algorithms to train the root structure to predict root diameter and root depth based on above-ground images of target plants.

7.1.3 Water Content Estimation

Generally, the system can extract a water content metric approximating the water content of a target plant in the agricultural field based on hyperspectral images of the target plant. More specifically, the system can: extract, from a first set of images including hyperspectral images, an initial value of a water content metric of the plant based on the first set of hyperspectral images; and populate a plant profile of the target plant with the initial value of the water content metric of the target plant. The system can then, as is further described below: predict a predicted value of the water content metric of the target plant at the target time based on the initial value of the water content metric of the target plant and a set of global condition data; and populate the plant profile of the target plant with the predicted value of the water content metric of the plant associated with the target time.

In one implementation, the system can extract a water content metric based on a hyperspectral vegetation index, such as canopy water content, leaf equivalent water thickness, and/or live fuel moisture content. For example, upon calculating a hyperspectral vegetation index, the system can access the plant volume index and estimate a total water content of the target plant.

7.1.4 Disease and Pest Pressure Metrics

Generally, the system can extract a disease pressure metric or a pest pressure metric based on the first set of images captured by the autonomous vehicle. More specifically, the system can extract an initial value of a disease or pest pressure metric of a target plant based on the first set of images; populate the plant profile of the target plant with the initial value of the disease or pest pressure metric of the target plant; predict a predicted value of the disease or pest pressure metric of the target plant at the target time based on the initial value of the disease or pest pressure metric of the target plant and a set of global condition data; and populate the plant profile of the target plant with the predicted value of the disease or pest pressure metric of the target plant associated with the target time, as is further described below. Thus, the system can characterize the health status of target plants in the agricultural field and inform pesticide and/or fungicide application operations for the target plants.

In one implementation, the system can execute and/or train a pest pressure model or a disease pressure model (i.e., a machine learning model) in order to extract a pest and/or disease pressure metric for a target plant based on images of the target plant. The system can train the pest pressure model and/or the disease pressure model based on a set of training examples including images of plants affected (or not affected) by a particular disease or pest labelled with a score indicating the progression of the disease or pest (e.g., early-, middle-, or late-stage disease; high-, medium-, or low-level of pest pressure). The system can then execute the pest or disease pressure model to characterize the level of pest or disease pressure affecting target plants in the agricultural field.

In another implementation, the system can execute multiple disease and/or pest pressure models, each model corresponding to a particular disease or pest known to affect the target plant. Thus, the system can extract multiple pest or disease pressure metrics from a single image of a target plant in order to identify both the type and extent of the pest or disease affecting the target plant.

7.2 Local Condition Data

Generally, in addition to extracting plant metrics that directly characterize individual target plants within the agricultural field, the system can also collect local condition data in the agricultural field in order to characterize local conditions in the field, which may vary based on solar incidence, micro-climatic variations in local weather, variable geography, variable soil conditions, or other phenomena that may cause variations in temperature, humidity, soil quality, and/or solar incidence across an agricultural field. More specifically, the autonomous vehicle can: capture a first set of local condition data, each local condition data point in the set of local condition data associated with a subregion of the agricultural field. The system can then for each target plant in the set of target plants, populate the plant profile of the target plant with an adjacent local condition data point of the target plant from the set of local condition data based on an adjacent region associated with the adjacent local data point, the adjacent region encompassing the location of the target plant; predict a predicted value of the plant metric of the target plant at the target time based on the initial value of the plant metric of the target plant, the set of global condition data, and the adjacent local condition data point of the target plant. The system can then append the adjacent local condition data point to a time series of adjacent local condition data of the target plant captured during a series of prior operating periods. Thus, the system can capture additional information specific to individual target plants in the agricultural field, which may impact the future state of individual target plants and, therefore, impact recommended agricultural operations for execution by the autonomous vehicle.

In one implementation, the system can track local condition data such as soil moisture content, soil nitrogen content, soil temperature, air temperature, and/or humidity. In this implementation, the autonomous vehicle can include a soil probe that is extensible into the soil as the autonomous vehicle navigates through the agricultural field and/or an air temperature and/or a moisture sensor. Thus, the autonomous vehicle can drag or otherwise sample the soil proximal to each target plant in the agricultural field to obtain more detailed environmental data corresponding to each target plant. Therefore, the system can correlate characteristics of the plants such as NDVI, yield, plant volume etc. with the local soil and air environmental data proximal to the plant in order to better predict yield and to schedule agricultural operations that may improve yield.

In this implementation, the autonomous vehicle can sample the soil and air proximal to a target plant at a predetermined or standardized position relative to the target plant. For example, the autonomous vehicle can record soil data from a soil probe when the autonomous vehicle is longitudinally aligned with a target plant and associate these soil data with the target plant. Likewise, the system can sample the air temperature and humidity sensor when longitudinally aligned with a target plant and associate these data with the target plant. Additionally or alternatively, the autonomous vehicle can stop over the target plant for a short moment to enable soil probes and air probes to respond to the local environmental data thereby improving measurements for certain types of data.

In another implementation, the autonomous vehicle can periodically record local condition data independent of the location of particular target plants in the agricultural field. For example, the autonomous vehicle can stop to record soil data once per crop row or once every ten yards. In this example, the autonomous vehicle does not ensure a one-to-one correspondence between certain local condition data and the target plants in the agricultural field. Thus, the system can associate each local condition data with a region of the plant map, where the region includes target plants that are proximal to the location at which these local condition data were recorded. Therefore, the system can associate a single local condition data point with multiple target plants (e.g., multiple plant profiles corresponding to these target plants).

In addition to extracting local condition data based on additional sensors mounted onto the autonomous vehicle, the system can extract local condition data from the set of images captured by the autonomous vehicle. For example, the autonomous vehicle can identify weeds or other non-target plants based on the set of images. The system can therefore calculate a weed density and store this statistic as local condition data. In another example, the system can analyze soil around target plants in the set of images; extract characteristics of the soil (e.g., looseness, soil type, moisture content, soil consistency) from the set of images (e.g., based on movement of soil around a probe suspended from the light module into the soil; based on color and "roughness" of soil depicted in these images); and/or read soil characteristics (e.g., moisture content, temperature) from a sensor probe suspended from the autonomous vehicle into the soil.

7.3 Agricultural Operation Data

Generally, in successive deployments of the autonomous vehicle, the autonomous vehicle executes agricultural operations on target plants within the agricultural field. During these deployments of the autonomous vehicle, the autonomous vehicle can capture a record of the agricultural operation executed on each target plant in the agricultural field, thereby generating a record (over successive deployments of the autonomous vehicle) of all agricultural operations executed on each target plant in the agricultural field. In applications of the autonomous vehicle in which the autonomous vehicle executes agricultural operations to a corresponding level or degree (e.g., a weeding blade gap, a quantity of water, a quantity of pesticide, a quantity of fertilizer), the autonomous vehicle can capture the level or degree to which the agricultural operation was executed and the system can populate the plant profile of the target plant with the instance of the agricultural operation as well as the degree of the agricultural operation that was executed on the target plant. Thus, the system can correlate the extent to which particular agricultural operations executed on target plants within the agricultural field affect the state of these target plants in the future.

More specifically, the autonomous vehicle can, during a second operating period and for each target plant in the set of target plants, capture a set of operation data associated with the agricultural operation executed on the target plant; and the system can populate the plant profile of the target plant with the set of operation data associated with the agricultural operation executed on the target plant. Upon completing many agricultural operations across many agricultural fields, the system can, therefore, improve agricultural operation planning and execution for future agricultural operations execute by the autonomous vehicle.

7.4 Global Condition Data

Generally, the system can generate accurate predictions of the future state of target plants in an agricultural field at a target time by supplementing relatively low-frequency (e.g., once a week) direct observation of plant metrics with relatively high-frequency (e.g., one a day) global condition data associated with the agricultural field. Thus, the system can continuously adapt predictions for the future state of target plants, as further described below, based on global condition data, thereby maintaining the accuracy of these predictions without requiring excessive deployment of the autonomous vehicle to the agricultural field.

More specifically, the system can access a set of global condition data associated with the agricultural field and captured during a target time interval between the first operating period and a target time in Blocks S150 and S250. Therefore, the system can receive a target time (i.e., a future time) for which to generate a prediction for the state of each target plant in the agricultural field and access any available global condition data for the time interval between the most recent operational period of the autonomous vehicle at the agricultural field and the target time.

For example, a system can receive a target time, two weeks in the future from a current date and three weeks from the most recent operational period of the autonomous vehicle at the agricultural field. In this example, the system can access global condition data for the last week and generate a prediction for the future state of target plants in the agricultural field based on these global condition data and the plant profiles of these target plants, which include the plant metrics observed at the most recent operating period.

In one implementation, the system can: access a set of global condition data including a series of satellite images of the agricultural field captured during the target time interval between the first operating period and the target time; and predict a predicted value of the plant metric of the plant at the target time based on the initial value of the plant metric of the plant and the series of satellite images of the agricultural field. In this implementation, the system can access satellite images depicting the agricultural field and extract vegetation indices (e.g., NDVI or NDRE) based on these satellite images in order to inform a plant state prediction model configured to predict the future state of individual plants in the agricultural field.

In another implementation, the system can: access a set of global condition data including a set of weather data associated with the agricultural field and captured during the target time interval between the first operating period and the target time; and predict the predicted value of the plant metric of a target plant at the target time based on the initial value of the plant metric of the target plant and the set of weather data associated with the agricultural field. In this implementation, the system can access (e.g., from a local weather station or stationary instrumentation deployed in the field) weather data, such as temperature, humidity, solar index, wind speed and direction. Alternatively, the autonomous vehicle can record soil moisture, air temperature, and humidity and the system can access soil moisture, air temperature, and humidity at a single location proximal the field as a set of global condition data.

In yet another implementation, instead of utilizing the global condition data as a direct input the plant state prediction model (as is further described below), the system can access the global condition data for time intervals between autonomous vehicle deployments and transform these global condition data into a time series of simulated local condition data. In this implementation, the system can utilize these simulated time series of local condition data as an input to the plant state prediction model in order to improve prediction of the state of individual target plants in the agricultural field based on the plant profile of these target plants.

In this implementation, upon recording multiple time-series of local condition data, the system can correlate these local condition data (corresponding with each target plant in the agricultural field) with concurrent global condition data. For example, the system can plot local condition humidity data against concurrent global condition data and calculate (e.g., via statistical regression or machine learning) that there is a linear function describing the relationship between the global condition data and the local condition data. However, the system can calculate any statistically describable relationship between the global condition data and the local condition data. Thus, upon identifying a function describing a relationship between each type of global condition data and corresponding local condition data, the system can interpolate or extrapolate local condition data based on this function. Therefore, although the autonomous vehicle may collect local condition data intermittently, the system can generate a set of approximate local condition data for time periods during which the autonomous vehicle is not navigating through the agricultural field.

More specifically, the system can: access a set of prior global condition data associated with the agricultural field and concurrent with the series of prior operating periods; for each target plant in the set of target plants, correlate the time series of adjacent local condition data of the target plant with the set of prior global condition data to generate a local condition model; predicting a time series of local condition data for the target time interval based on the local condition model and the set of global condition data; and predict the predicted value of the plant metric of the target plant at the target time based on the initial value of the plant metric of the target plant and the time series of local condition data.

8. Plant State Prediction Model

Generally, the system can execute and/or train a plant state prediction model in order to predict the state of an individual target plant at a future target time (i.e., a future time) based on the plant profile to the target plant and/or global condition data associated with the agricultural field of the target plan. More specifically, the system can, for each target plant in the set of target plants: predict a predicted value of the plant metric of the target plant at the target time based on the plant profile of the target plant (including the initial value of the plant metric of the target plant) and the set of global condition data in Block S160. The system can then populate the plant profile of the target plant with the predicted value of the plant metric of the target plant associated with the target time in Block S144. Thus, the system can predict a plant state (represented by a set of predicted values of plant metrics) of any target plant in the agricultural field, thereby enabling the system to automatically adjust future agricultural operations on a plant-specific basis and to recommend deployment of the autonomous vehicle to perform selected agricultural operations based on the predicted future state of target plants in the agricultural field, as is further described below.

The system can execute and/or train multiple plant state prediction models, each plant state prediction model corresponding to a particular species of target plant. Additionally, the system can execute and/or train multiple plant state prediction models, each corresponding to a particular region (e.g., the Central Valley) or geospatial latitude (e.g., 45-47 degrees north) in order to account for differences in plant growth due to factors inherent to the location of the agricultural field.

In one implementation, the system can train a plant state prediction model based on: a complete time series of plant states (e.g., daily values of each relevant plant metric) from an example field for which the autonomous vehicle was deployed at a greater frequency (e.g., daily); and a concurrent time series of global condition data. Thus, the system can execute supervised learning algorithms to train the plant state prediction model (e.g., implemented as a recurrent neural network or a long short-term memory neural network) that predicts future states of target plants based on available prior plant states and/or global condition data. In one example of this implementation, the system can also include local condition data and/or simulated local condition data in the set of training examples and, therefore, enable the system to take these local condition data or simulated local condition data as input to the plant state prediction model.

Therefore, the system can execute a plant state prediction model that takes as input the plant profile of an individual target plant and a set of global condition data up to the current time (or forecasted in the case of weather data) and outputs the state of the individual target plant at a specified future time. The system can then repeatedly execute this plant state prediction model for each target plant in the set of target plants in order to generate the full state of the agricultural field.

9. Operation Planning

Generally, the system can, based on an output of the plant state prediction model, plan agricultural operations to be executed on individual target plants by the autonomous vehicle in order to prepare operators of the autonomous vehicle to properly configure the autonomous vehicle for the planned agricultural operations and to enable the autonomous vehicle to execute plant-specific operations on each target plant in the agricultural field. More specifically, in this implementation the system can, prior to the target time and for each target plant in the set of target plants, generate an agricultural operation plan for the target plant based on the predicted value of the plant metric of the target plant. The autonomous vehicle can then, during the second operating period and for each plant in the set of plants: access the agricultural operation plan for the target plant; and execute the agricultural operation on the target plant in accordance with the agricultural operation plan for the target plant. Thus, the system can preconfigure the autonomous vehicle with a plant-specific operational plan prior to redeployment of the autonomous vehicle, thereby enabling the autonomous vehicle to automatically execute these plant-specific agricultural operations upon identifying each target plant and without requiring additional onboard computation at the autonomous vehicle.

In this implementation, the system can store the plant-specific agricultural operation for a target plant in association with the plant profile of the target plant, thereby enabling efficient access to the planned agricultural operation by the autonomous vehicle.

10. Autonomous Vehicle Redeployment

Generally, upon generating an agricultural operation plan, the system can redeploy the autonomous vehicle at the target time to execute the planned agricultural operations on the set of target plants in the agricultural field. More specifically, the autonomous vehicle can, during a second (subsequent) operating period concurrent with the target time: autonomously navigate within the agricultural field in Block S104; capture a second set of images of the set of plants within the agricultural field in Block S114; and capture a second set of location data of the autonomous vehicle in Block S116. Thus, upon redeployment to the agricultural field, the autonomous vehicle can capture a set of images and a set of location data as described above with respect to the initial deployment of the autonomous vehicle in order to: localize target plants in the agricultural field; associate these target plants with stored plant profiles; and execute planned plant-specific agricultural operations on the target plants.

Generally, during a redeployment of the autonomous vehicle to the agricultural field, the autonomous vehicle can, in real-time, access a plant profile of a target plant in the set of target plant, extract the location of the target plant; upon approaching the target plant in the agricultural field, identify the target plant; and execute a plant-specific agricultural operation on the target plant. More specifically, the autonomous vehicle can: access the location of the plant and the predicted value of the plant metric of the plant from the plant profile of the plant in Block S170; identify the plant based on the second set of images, the second set of location data, and the location of the plant in Block S180; and execute an agricultural operation on the plant based on the predicted value of the plant metric of the plant in Block S190. Thus, the autonomous vehicle can access plant profiles in order to repeatedly identify (over successive deployments) specific target plants in the agricultural field despite growth of the target plant and/or changes in the visual appearance of specific target plants in the agricultural field over time.

10.1 Plant Profile Access

Generally, the system accesses the location of a target plant and a planned agricultural operation for the target plant based on the predicted value of the plant metric of the plant from the plant profile of the plant in Block S170. In one implementation, the autonomous vehicle can store the set of plant profiles corresponding to the set of target plants in the agricultural field locally onboard the autonomous vehicle. Alternatively, the autonomous vehicle can access the plant profile database and retrieve the set of plant profiles corresponding to the set of target plants for the agricultural field prior to deployment to the agricultural field. Thus, the system can readily access the location of individual target plants in the agricultural field and the planned agricultural operation for each target plant in the agricultural field.

In one implementation, the system and/or the autonomous vehicle can order the plant profiles of the target plants in the agricultural field based on a planned route of the autonomous vehicle within the agricultural field. Therefore, in this implementation, the autonomous vehicle can access plant profiles for target plants in the same order in which the autonomous vehicle encounters the target plants upon deployment to the agricultural field, thereby facilitating identification of these target plants.

10.2 Plant Identification

Generally, the system can identify each target plant in the set of target plants in the agricultural field based on the second set of images, the second set of location data, and the location of the target plant in Block S180. More specifically, the autonomous vehicle can execute the aforementioned steps: to navigate to the agricultural field; to autonomously navigate along a first crop row of the agricultural field; and to localize itself relative to the plant map. More specifically, the autonomous vehicle can: identify locations of an initial set of target plants while navigating along the first crop row of the agricultural field based on an initial set of images; construct an incomplete plant map based on the initial locations; track its location relative to the incomplete plant map; and, in real-time, align the incomplete plant map with the plant map. Once the autonomous vehicle has localized itself based on the plant map, the autonomous vehicle can identify plants in real-time by tracking the location of the autonomous vehicle relative to the plant map as the autonomous vehicle navigates through the agricultural field. Thus, the system can accurately link target plants detected in the agricultural field during a deployment with plant profiles maintained by the system in order to execute agricultural operations scheduled for the particular plant profile.

In an alternative implementation, the system can organize the set of plant profiles based on the crop row in which each corresponding target plant is located and order these plant profiles based on the order in which the corresponding target plants are located within the crop row. In this implementation, the autonomous vehicle can align itself with a crop row and, based on the order of target plants in the crop row, identify each successive target plant upon classifying the target plant as a target plant (and not a weed). In this implementation, the autonomous vehicle can retroactively verify the identity of each target plant by matching an incomplete plant map with the previously generated plant map as described above.

10.3 Executing Agricultural Operations

Generally, upon identifying a particular target plant in the agricultural field the autonomous vehicle can perform a planned agricultural operation on the target plant in Block S190. More specifically, the autonomous vehicle can: access the plant profile of the target plant; identify a planned agricultural operation for the target plant; and execute the agricultural operation on the target plant. Thus, the autonomous vehicle can execute agricultural operations tailored to specific target plants in the agricultural field based on the location of these plants in the agricultural field. Additionally, while executing one or more scheduled agricultural operations on the target plant, the autonomous vehicle can: capture 2D or 3D images of the target plant; record local condition data associated with the target plant; and update the plant profile of the target plant based on the recorded local condition data and the recorded 2D and 3D images of the target plant.

In one implementation, the autonomous vehicle executes an agricultural operation on each target plant based specifically on the predicted plant metric of the target plant stored in the plant profile of the target plant. In this implementation, the system can access a specific predicted value and lookup a corresponding degree or setting with which to execute the planned agricultural operation. Thus, the system can dictate agricultural operations to the autonomous vehicle based on predicted values of plant metrics without explicitly generating an operation plan.

In another implementation, the autonomous vehicle can execute a weeding operation on a target plant in the agricultural field based on the plant profile of the target plant. More specifically, the system can set a maximum blade gap for a weeding operation on the target plant based on the predicted value of the plant metric of the target plant; and the autonomous vehicle can execute the weeding operation on the plant in accordance with the maximum blade gap. In this implementation, the system can set the maximum blade gap for the weeding operation based on the predicted root diameter metric and/or the predicted root depth metric of the target plant.

In yet another implementation, the autonomous vehicle can execute a harvesting operation on a target plant in the agricultural field based on the plant profile of the target plant. More specifically, the system can: generate a harvesting designation based on a predicted value of a plant metric of a target plant; and the autonomous vehicle can, in response to the harvesting designation indicating that the target plant is designated for harvesting, execute a harvesting operation on the target plant. In this implementation, the system can generate the harvesting designation for the target plant based on the predicted value of the plant volume metric of the target plant, the predicted value of the water content metric of the target plant, and/or a predicted value of a plant mass metric based on the predicted value of the plant volume metric and the water content metric. In this implementation, the system stores a binary harvesting designation (indicating whether particular target plants are planned for harvesting or planned for continued growth within the agricultural field) in association with the plant profile of each target plant.

In yet another implementation, the autonomous vehicle can execute a fertilizing operation based on the plant profile of a target plant. More specifically, the system can calculate a fertilizer quantity based on the predicted value of a plant metric of the target plant; and the autonomous vehicle can dispense the fertilizer quantity at the target plant. In this implementation, the system can calculate the fertilizer quantity for a target plant based on a predicted value of a growth metric of the target indicating the mass of the plant relative to the target plant's maturity. The system can predict the value of the growth metric based on the plant profile including global condition data and local condition data.

Thus, the autonomous vehicle can dispense a plant-specific quantity of fertilizer to each target plant in the agricultural field.

In yet another implementation, the autonomous vehicle can execute a pesticide dispensing operation based on the plant profile of a target plant. More specifically, the system can calculate a pesticide quantity based on the predicted value of the plant metric of the target plant; and dispense the pesticide quantity at the target plant. In this implementation, the system can calculate the pesticide quantity based on a predicted value of a pest or disease pressure metric. Thus, the autonomous vehicle can dispense plant-specific quantities of pesticide to target plants in the agricultural field.

In yet another implementation, the autonomous vehicle can execute a watering operation based on the plant profile of a target plant. More specifically, the system can calculate a water quantity based on the predicted value of the plant metric of the plant; and the autonomous vehicle can dispense the water quantity at the plant. In this implementation, the system can calculate the water quality based on a predicted value of a water content metric of the target plant. Thus, the autonomous vehicle can dispense plant specific water quantities to target plants in the agricultural field.

10.3.1 Real-Time Operation Adjustment

Generally, the autonomous vehicle can adjust a planned agricultural operation for a target plant in the agricultural field in real-time based on images captured by the autonomous vehicle during the same operational period. More specifically, the system can, prior to the target time and for each target plant in the set of plants, generate an agricultural operation plan for the target plant based on a predicted value of a plant metric of the target plant. The autonomous vehicle can then, during the second operating period and for each target plant in the set of target plants: access the agricultural operation plan for the target plant from the plant profile of the target plant; in response to identifying the plant based on the second set of images, calculate an adjusted value of the plant metric of the target plant based on the second set of images recorded during the second operating period; adjust the agricultural operation plan for the plant based on the adjusted value of the plant metric of the target plant to generate an adjusted agricultural operation plan for the target plant; and execute the agricultural operation on the target plant in accordance with the adjusted agricultural operation plan for the target plant. Thus, the autonomous vehicle can capture entry images of target plants prior to executing a planned agricultural operation; and, in response to detecting these images that the predicted value of the plant metric from which the system calculated the planned agricultural operation is inaccurate, adjust the planned agricultural operation in accordance with an adjusted value of the plant metric.

For example, in an application in which the autonomous vehicle is executing a weeding operation on a target plant with a planned maximum blade gap, the autonomous vehicle can, during a second operating period: capture an image of a target plant; estimate an adjusted root diameter metric and an adjusted root depth metric based on the image of the target plant; and adjust the maximum blade gap based on the adjusted root diameter metric and the adjusted root depth metric. However, the system can adjust any plant metric and, therefore, any planned agricultural operation based on a plant metric during an operating period.

In one implementation, upon calculating adjusted plant metrics for the target metrics, the autonomous vehicle can, in real-time store these adjusted plant metrics in association with the plant profile of the target plant.

10.4 Real-Time Operation Selection

Generally, in one variation, the system can capture images of particular plants in the agricultural field and select and/or modify scheduled operations for these particular plants in real-time based on the plant profile of the particular plant. More specifically, the system can: capture an image of a target plant; identify the target plant and a location of the autonomous vehicle relative to the plant map; access the plant profile of the target plant; select an agricultural operation for the target plant; and execute the selected agricultural operation on the target plant. Thus, the system can schedule agricultural operations in real-time (e.g., within one deployment of the autonomous vehicle or seconds/minutes after an observation) based on observations made during the same agricultural deployment. For example, the system can identify that a target plant is more dehydrated than expected based on an entry image of a target plant and can adjust the amount of water dispensed in a scheduled watering operation based on this observation. Alternatively, the system can identify weeds surrounding a target plant and select a weeding operation for the target plant. The system can then, in real-time, align a weeding module with this target plant and remove weeds surrounding the target plant.

11. Anomaly Detection

Generally, the system can execute anomaly detection based on predicted plant metrics for specific target plants in the agricultural field, in real-time or post-deployment of the autonomous vehicle. More specifically, the system can, for each target plant in the set of target plants: calculate an adjusted value of a plant metric of the target plant; and detect an anomaly associated with the target plant based on a difference between the adjusted value of the plant metric of the target plant and the predicted value of the plant metric of the target plant. Thus, the system can alert operators to potential problems within the agricultural field, such as failures in irrigation systems or unexpected pest problems that may cause anomalies in the expected features of crops in the field.

In one implementation, upon calculating a difference between the predicted value of a plant metric of a target plant and an adjusted value of the plant metric of the target plant, the system can detect whether the difference exceeds a threshold difference. In this implementation, the system can define the threshold deviation as a number of standard deviations based on a statistical model or as an absolute value of the plant metric.

In one implementation, upon detecting an anomaly, the system can generate a prompt or notification for operators of the system indicating the anomaly and/or potential causes of the anomaly. For example, the system can detect an anomaly in the value of a pest or disease pressure metric and generate a prompt recommending disease or pest control measures. In another example, the system can detect an anomaly in the value of a water content metric and recommend additional irrigation and/or watering operations on target plants in the agricultural field.

In another implementation, the system can spatially cluster target plants characterized by anomalous plant metrics and indicate the region occupied by the cluster to operators of the system. Thus, the system can indicate the location of the anomalous target plants, thereby enabling operators to more accurately diagnose factors that may be affected these target plants.

12. Agricultural Operation Recommendations

Generally, the system can execute Blocks of the method S200 (some of which are described above) to generate recommendations for deployment and operation of the autonomous vehicle. More specifically, the system can: predict a time series of a plant metric for a target plant in the agricultural field based on the plant profile of the target plant (e.g., an initial value of the plant metric of the target plant) and the global condition data associated with the agricultural field, wherein the time series of the plant metric represents the predicted progression of the target plant over time (with respect to the plant metric) in Block S260; and populate the plant profile of the target plant with the time series of the plant metric in Block S270. The system can then generate a plant-specific timing recommendation for an agricultural operation on the target plant that is associated with the plant metric in Block S280. For example, the system can predict a time series of a plant volume metric and identify a peak data point in the plant volume time series indicating the predicted time at which the target plant will exhibit its maximum plant volume. The system can then recommend a harvesting operation concurrent with the peak time, thereby maximizing yield for the target plant.

Alternatively, the system can generate a timing recommendation based on other data points instead of the peak data point in the predicted time series of a plant metric. In one example, the system can identify a data point in the time series of a plant metric in which the value of the plant metric exceeds or becomes less than a threshold value for the plant metric. For example, the system can generate a timing recommendation for a watering operation at a target time, in response to detecting that a threshold value of a water content metric exceeds a value of the water content metric at the threshold time. Thus, the system can identify a target time for a timing recommendation based on any characteristic of the time series of a plant metric.

In one implementation, in order to predict a time series of a plant metric for a target plant, the system can execute the plant state prediction model with a set of target times corresponding to each time slot in the time series. For example, the system can predict a daily time series of a plant metric for two weeks from a current time by executing the plant state prediction model with a set of target times including each day in a two-week period.

Additionally, by executing these Blocks of the method S200 across each target plant in the set of target plants within the agricultural field, the system can identify timing recommendations for deployment of the autonomous vehicle to the agricultural field. More specifically, the system can generate a timing recommendation for an agricultural operation based on the plant profile of each plant in the set of plants, the timing recommendation designating a target time in Block S280. Thus, after generating individual timing recommendations for each target plant in the agricultural field, the system can calculate a single timing recommendation for deployment of the autonomous vehicle to the agricultural field that balances the costs of deploying the autonomous vehicle (e.g., fuel costs, operator time) with the goal of executing agricultural operations at the recommended timing for as many target plants as possible given deviations in the timing recommendations for the set of target plants.

In one implementation, the system can generate this single timing recommendation for the agricultural field by aggregating the time series of the plant metric across all target plants in the agricultural field to calculate a time series of an aggregate plant metric. More specifically, the system can: access the time series of the plant metric of each target plant in the set of target plants from the plant profile of each target plant in the set of target plants; aggregate the time series of the plant metric of each target plant in the set of target plants to generate a time series of an aggregate plant metric for the agricultural field in Block S282; identify a peak data point in the time series of the aggregate plant metric, the peak data point corresponding to a peak time in Block S284; and generate a timing recommendation for an agricultural operation at the peak time in Block S286. Thus, the system can combine the many plant-specific predicted time series of the plant metric into a single aggregate plant metric.

In one implementation, the system can generate the aggregate plant metric by averaging the values of the plant metric across each time series of the plant metric and for each time slot in the time series. Thus, in this implementation, each data point in the time series of the aggregate plant metric indicates the predicted average value of the plant metric across a particular time. Additionally, the system can weight the aggregate plant metric based on other plant metrics of each target plant. For example, the system can calculate an aggregate plant volume metric equal to an average of the plant volume metric weighted based on a water content metric of each target plant in the agricultural field. Alternatively, the system can generate the aggregate plant metric by summing the values of the plant metric across each time series of the plant metric and for each time slot in the time series.

In another implementation, the system can render an operator interface for receiving a selection of a subset of target plants in the agricultural field. In response to receiving the selection, the system can calculate a time series of an aggregate plant metric based on the subset of target plants. Thus, the system can enable operators to define specific subsets of the agricultural field for which the system can generate timing recommendations.

In one variation, the system can generate a deployment recommendation that includes a timing recommendation for an agricultural operation and a recommended subset of target plants in the agricultural field on which to execute the agricultural operation. More specifically, the system can generate a deployment recommendation for an autonomous vehicle based on the plant profile of each target plant in the set of target plants, the deployment recommendation for the autonomous vehicle designating a target time for deployment of the autonomous vehicle and designating a subset of plants in the set of plants for an agricultural operation in Block S290. Thus, the system can recommend agricultural operations for the autonomous vehicle to execute for particular regions of the agricultural field.

In one implementation, the system can generate a schedule of deployment recommendations for a given time period in order to include the execution of earlier agricultural operations in the recommendations for later agricultural operations. More specifically, the system can generate a timing or deployment recommendation for an agricultural operation based on the plant profile of each target plant in the set of plants, the timing recommendation designating a schedule of target times. In this implementation, the system can store recommended agricultural operations in the plant profiles of target plants. Therefore, when making recommendations for later agricultural operations, the system can predict values of plant metrics based on these intervening recommendations. For example, the system can: generate a first timing recommendation for a watering operation on a target plant in one week; store the planned watering operation in the plant profile of the target plant; and generate a second subsequent watering operation in two weeks based on the plant profile and the plant state prediction model.

Therefore, in this implementation, the system can update later timing or deployment recommendations for the autonomous vehicle upon recommending intervening agricultural operation. More specifically, the system can, for each plant in the set of plants: extract an initial value of a second plant metric of the target plant based on a first set of images; populate the plant profile of the target plant with the initial value of the second plant metric of the target plant; predict a time series of the second plant metric of the target plant based on the initial value of the second plant metric of the target plant and the set of global condition data; populate the plant profile of the target plant with the time series of the second plant metric of the target plant; aggregate the time series of the second plant metric of each target plant in the set of target plants to generate a time series of an aggregate second plant metric for the agricultural field; identify a second peak data point in the time series of the aggregate second plant metric corresponding to a second peak time, the second peak time preceding the first peak time; generate a second timing recommendation for a second agricultural operation at the second peak time; and, in response to generating the second peak time preceding the first peak time, update the first timing recommendation for the first agricultural operation. Thus, the system can consider the effects of a first type of agricultural operation on later-recommended second type of agricultural operation.

In another implementation, the system can generate timing and/or deployment recommendations for agricultural operations by recursively executing the plant state prediction model on the output of the method S200 for a previous time step. For example, the system can access a current plant profile of a target plant and a current set of global condition data; generate a first predicted plant state of the target plant one day in the future via the plant state prediction model; generate a deployment recommendation based on the first predicted plant state and the current set of global condition data; and store any deployment recommendations and the first predicted plant state in association with the plant profile. The system can then access the first predicted plant state and the current set of global condition data from the plant profile of the target plant to generate a second predicted plant state of the target plant two days in the future via the plant state prediction model. Thus, the system can recursively evaluate the plant state prediction model and execute Blocks of the method S200 to generate a schedule of recommendations for agricultural operations over a future time interval.

In yet another implementation, the system can, in response to receiving a set of updated global condition data (e.g., updated weather forecasts, a new satellite image), update previously generated recommendations for agricultural operations in the agricultural field. More specifically, the system can access a set of updated global condition data associated with the agricultural field and, for each target plant in the set of target plants: predict an updated time series of the plant metric of the target plant based on the initial value of the plant metric of the target plant and the updated set of global condition data; and populating the plant profile of the target plant with the updated time series of the plant metric of the target plant to generate an updated plant profile of the target plant. The system can then generate an updated timing recommendation for the agricultural operation based on the updated plant profile of each target plant in the set of target plants, the updated timing recommendation designating an updated target time different from an initial target time. Thus, as the system gains access to new global condition data, the system can update the current set of timing recommendations and/or deployment recommendations for the autonomous vehicle at the agricultural field.

Likewise, the system can update timing recommendations and/or deployment recommendations for the autonomous vehicle at the agricultural field based on intervening direct observations of target plants within the agricultural field during an intervening operating period of the autonomous vehicle. More specifically, the autonomous vehicle can, during a second operational period: autonomously navigate within the agricultural field; capture a second set of images of the set of target plants within the agricultural field; and capture the second set of location data of the autonomous vehicle. The system can then, for each plant in the set of plants: access the location of the target plant from the plant profile of the target plant; identify the target plant in the second set of images based on the location of the target plant and the second set of location data of the autonomous vehicle; extract a predicted value of the plant metric of the target plant based on the second set of images; populate the plant profile of the target plant with the predicted value of the plant metric of the target plant; predict an updated time series of the plant metric of the target plant based on the predicted value of the plant metric of the target plant and the set of global condition data; and populate the plant profile of the target plant with the updated time series of the plant metric of the target plant to generate an updated plant profile of the target plant. The system can then generate an updated timing recommendation for the agricultural operation based on the updated plant profile of each target plant in the set of plants, the updated timing recommendation designating an updated target time different from an initial target time. Thus, the system can leverage the most recent plant metrics extracted from images of target plants in the agricultural field, thereby increasing the effectiveness of recommendations generated by the system.

12.1.1 Temporal Clustering

In one implementation, instead of generating a timing recommendation based on the peak time, the system can generate timing recommendations for deployment of the autonomous vehicle by identifying temporal clusters of plant-specific timing recommendations for the set of target plants. More specifically, the system can, for each target plant in the set of target plants: generate a plant-specific timing recommendation for the target plant based on the plant profile of the target plant; and append the plant-specific timing recommendation for the target plant to a set of plant-specific timing recommendations. The system can then: identify a cluster of plant-specific timing recommendations in the set of plant-specific timing recommendations; and calculate the timing recommendation for the agricultural operation based on the cluster of plant-specific timing recommendations, the timing recommendation designating a target time. Thus, by executing a clustering algorithm to identify temporal clusters of plant specific timing recommendations, the system can identify distinct subsets of the set of target plants that are predicted to benefit from the agricultural operation at distinct times.

In one example, the system can: identify a first cluster of plant-specific timing recommendations; identify the target plants within the first cluster; calculate a target time for an agricultural operation to be executed on the first cluster; and repeat this process for a second cluster of plant-specific timing recommendations. Thus, the system generates two timing recommendations for deployment of the autonomous vehicle to execute the agricultural operation for two distinct subsets of target plants in the agricultural field.

12.1.2 Spatial Clustering

In one implementation, the system can further group sets of plant-specific agricultural operation recommendations based on the spatial distribution of target plants in the agricultural field. More specifically, the system can: identify a cluster of timing recommendations in the set of timing recommendations, the cluster of timing recommendations corresponding to a first subset of target plants in the set of target plants; for each target plant in the first subset of target plants, accessing the location of the target plant from the plant profile of the target plant; identify a spatial cluster of target plants in the first subset of plants based on the location of each target plant in the first subset of plants, the spatial cluster comprising a second subset of target plants in the set of target plants; designate the target time for deployment of the autonomous vehicle; and designate the second subset of target plants in the set of target plants for the agricultural operation. Thus, the system can further reduce deployment costs by generating deployment recommendations to execute agricultural operations on plants that are spatially proximate, thereby preventing excessive navigation distances for the autonomous vehicle.

12.1.3 Related-Operation Refinement

In one implementation, the system can update timing recommendations for agricultural operations in a first agricultural field based on observations of plant metrics in a related agricultural field. More specifically, the autonomous vehicle can, during a second operational period: autonomously navigate within a related agricultural field; capture a second set of images of a related set of target plants within the related agricultural field; and capture the second set of location data of the autonomous vehicle. The system can then, for each target plant in the related set of target plants: extract a predicted value of the plant metric of the target plant based on the second set of images; predict an updated time series of the plant metric of the target plant based on the predicted value of the plant metric of each target plant in the related set of target plants and the set of global condition data; and populate the plant profile of the target plant with the updated time series of the plant metric of the target plant to generate an updated plant profile of the target plant. The system can then generate an updated timing recommendation for the agricultural operation based on the updated plant profile of each target plant in the set of target plants, the updated timing recommendation designating an updated target time different from the initial target time. Thus, the system can further refine timing recommendations in one agricultural field based on plant metrics observed for target plants in an adjacent or otherwise related target field, thereby increasing the efficacy of timing recommendations for the first agricultural field.

12.2 Operation-Specific Recommendation Models

Generally, the system can generate timing recommendations and deployment recommendations for a variety of agricultural operations based on distinct plant metrics within plant profiles and/or distinct global condition data in the set of global condition data. Thus, the system can execute a set of operation-specific recommendation models in order to effectively recommend agricultural operations for execution by the autonomous vehicle.

12.3 Weeding Recommendation

In one example, the system can generate a target time for a weeding recommendation based on the predicted time series of the weed density metric proximal to (i.e., within a threshold distance of) a target plant in the agricultural field. More specifically, the system can: extract the initial value of the weed density metric of the target plant based on the first set of images; populate the plant profile of the target plant with the location of the target plant and the initial value of the weed density metric of the target plant; predict a time series of the weed density metric of the target plant based on the initial value of the weed density metric of the target plant and the set of global condition data; and populate the plant profile of the target plant with the time series of the weed density metric of the target plant. The system can then generate the plant-specific timing recommendation for the weeding operation based on an earliest data point in the time series of the weed density metric that exceeds a threshold weed density.

12.4 Harvesting Recommendation

In another example, the system can generate a target time for a plant-specific harvesting recommendation based on the predicted time series of a plant volume metric of a target plant in the agricultural field. More specifically, the system can: extract the initial value of the plant volume metric of the target plant based on the first set of images; populate the plant profile of the target plant with the location of the target plant and the initial value of the plant volume metric of the target plant; predict a time series of the plant volume metric of the target plant based on the initial value of the plant volume metric of the target plant and the set of global condition data; and populate the plant profile of the target plant with the time series of the plant volume metric of the target plant. The system can then generate a timing recommendation for the harvesting recommendation based on a peak data point in the time series of the plant volume metric of the target plant.

In yet another example, the system can generate a harvesting recommendation based on a time series of the aggregate predicted yield of the agricultural field. In this example, the system can combine multiple plant metrics including a plant volume metric and/or a water content metric and calculate a time series of the predicted yield for each target plant in the agricultural field. The system can then: aggregate these time series across the agricultural field; identify a peak time corresponding to a peak data point of the time series of the aggregated predicted yield; and generate a timing recommendation for the harvesting operation designating a target time corresponding to the peak time. Thus, the system can calculate plant metrics with actionable values such that each aggregated time series is representative of actionable plant states of the target plants in the agricultural field.

12.5 Watering Recommendation

In one example, the system can generate a target time for a watering operation based on a predicted water content metric of a target plant in the agricultural field. More specifically, the system can extract the initial value of the water content metric of the target plant based on the first set of images; populate the plant profile of the target plant with the location of the target plant and the initial value of the water content metric of the target plant; predict a time series of the water content metric of the target plant based on the initial value of the water content metric of the target plant and the set of global condition data; and populate the plant profile of the target plant with the time series of the water content metric of the target plant. The system can then identify the earliest data point in the time series of the water content metric of the target plant for which the value of the water content metric is exceeded by a threshold value of the water content metric. Thus, the system can identify a data point at which the water content of a target plant falls below a threshold value and generate a recommendation for a watering operation at the target time corresponding to the data point.

12.6 Fertilizing Recommendation

In one example, the system can generate a target time for a fertilizing operation based on the predicted plant volume metric. More specifically, the system can: extract the initial value of the plant volume metric of the target plant based on the first set of images; populate the plant profile of the target plant with the location of the target plant and the initial value of the plant volume metric of the target plant; predict a time series of the plant volume metric of the target plant based on the initial value of the plant volume metric of the target plant and the set of global condition data; and populate the plant profile of the target plant with the time series of the plant volume metric of the plant. The system can then identify an earliest data point in the time series of the plant volume metric for which the derivative of the plant volume metric falls below a threshold value and generate a target time corresponding to this earliest data point.

12.7 Pesticide Application Recommendation

In one example, the system can generate a target time for a pesticide application operation based on the predicted pest pressure metric of a target plant. More specifically, the system can: extract the initial value of the pest pressure metric on the target plant based on the first set of images; populate the plant profile of the target plant with the location of the target plant and the initial value of the pest pressure metric on the target plant; predict a time series of the pest pressure metric on the target plant based on the initial value of the pest pressure metric on the target plant and the set of global condition data; and populate the plant profile of the plant with the time series of the pest pressure metric on the plant. The system can then identify an earliest data point in the time series of the plant volume metric for which the pest pressure metric exceeds a threshold pest pressure value and generate a target tie corresponding to the earliest data point in the time series of the pest pressure metric.

12.8 Operation Decision Model

In one variation, upon generating a plant map, plant profiles for each target plant in the agricultural field, and plant metrics, local condition data, and/or approximate local condition data for each of those plant profiles, the system can generate recommended agricultural operations for each target plant in the agricultural field based on an operation decision model (distinct from the plant state prediction model). More specifically, the system can: train an operation decision model (an artificial neural network such as an LSTM recurrent neural network) based on a corpus of plant profiles collected over a number of seasons (for different agricultural fields); input the current plant profiles for each target plant in the agricultural field; and output a schedule of agricultural operations for each target plant in the agricultural field. For example, the system can: generate a plant map for a new agricultural field; collect initial plant metrics, local condition data, and approximate local condition data for the target plants in the agricultural field; input these recommend specific timings (e.g., with a weekly, daily, or hourly resolution) for weeding operations, watering operations, fertilizing operations, pesticide-dispensing operations, and/or harvesting operations, for each target plant in the agricultural field.

In one implementation the system can generate a schedule for each target plant in the agricultural field. because each target plant in the agricultural field is located within a close geographic proximity and therefore experience similar environmental data, the operation decision model provides similar operative schedules for each plant.

However, the system can also generate a schedule based on the frequency with which the autonomous vehicle can deploy to the agricultural field. For example, if the agricultural vehicle can only deploy to the agricultural field every other day, the system can coalesce agricultural operations into each deployment (e.g., by moving operations scheduled for intervening days to the nearest deployment). Thus, the system can modify the schedule generated by the operation decision model in order to fit deployments of the autonomous vehicle.

Furthermore, in some implementations, the autonomous vehicle can be outfitted with individual tool modules (e.g., a weeding module, a water module, a fertilizing module), which can perform only a single agricultural operation per deployment into the agricultural field. Therefore, the system can modify the schedules generated for particular target plants by the operation decision model in order to batch particular operations based on deployments of an autonomous vehicle to the field when equipped with particular tool modules.

In one implementation, the system can train an operation decision model for each type of plant supported by the system. For example, the system could train and execute a separate operation decision model for lettuce, cabbage, broccoli, cauliflower, carrots, strawberries, etc. Additionally or alternatively, the system can train separate operation decision models for each type of agricultural operation supported by the autonomous vehicle. For example, the system can train a watering model that schedules watering operations, a weeding model that schedules weeding operations, etc.

In one implementation, the system can provide operation prompts for operations not supported by the autonomous vehicle, and which can be executed by other agricultural equipment. Thus, the system can integrate with other agricultural systems to incorporate additional data streams and recommend when these operations should be executed by third party agricultural machines. For example, the system can integrate with a third-party irrigation system. In this example, the system can: access water volume data for the agricultural field; and recommend and/or automatically adjust watering intervals and watering volume of the third-party irrigation system.

12.9 Inputs

Generally, the system can generate an input vector for the operation decision model based on a plant profile of a target plant in the agricultural field. More specifically, the input vector for the operation decision model can include a set of timeseries for each of the plant metrics and local environmental data stored in association with a plant profile of a target plant. Additionally or alternatively, the system can utilize an input vector that includes the 3D model of the target plant. The system can then execute the operation decision model on the input vector to generate an output schedule for the target plant.

12.10 Outputs

Generally, the system can execute the operation decision model on an input vector for a target plant in order to generate an operation prompt for the target plant. More specifically, the system executes the operation decision model to generate an agricultural operation from a set of supported agricultural operations and a scheduled time to perform the agricultural operation. Additionally, the system can output multiple recommended operations and scheduled times to generate a complete schedule for the target plant.

The system can periodically reevaluate the operation decision model on an input vector for a target plant upon recording new data for the target plant in the plant profile of the target plant. The system can evaluate the operation decision model on each target plant in the set of target plants in the agricultural field to generate an operative schedule for each target plant in the agricultural field.

In one implementation, the system can combine these schedules corresponding to individual target plants into a single schedule for the agricultural field based on an assumption that each target plant will benefit from the same operation at approximately the same time. Additionally or alternatively, the system can group multiple schedules together (e.g., via cluster analysis) for groups of similar target plants (e.g., target plants for which the system has output similar schedules). Thus, upon deployment of the autonomous vehicle to the agricultural field, the autonomous vehicle can execute these bulk operations on groups of target plants without requiring excessive switching of operations.

12.10.1 Training

Generally, the system can train the operation decision model via supervised learning algorithms based on a training data set. The training data set can include plant profiles from seeding to harvest and an indication of the resulting yield of the plant. More specifically, the system can execute reinforcement learning techniques in order to mimic successful agricultural operation schedules and adapt these schedules for the particular environmental data within the field. Therefore, the system can access previous sets of agricultural data collected by the autonomous vehicle in order to train the operation decision model.

The systems and methods described herein can be embodied and/or implemented at least in part as a machine configured to receive a computer-readable medium storing computer-readable instructions. The instructions can be executed by computer-executable components integrated with the application, applet, host, server, network, website, communication service, communication interface, hardware/firmware/software elements of a user computer or mobile device, wristband, smartphone, or any suitable combination thereof. Other systems and methods of the embodiment can be embodied and/or implemented at least in part as a machine configured to receive a computer-readable medium storing computer-readable instructions. The instructions can be executed by computer-executable components integrated by computer-executable components integrated with apparatuses and networks of the type described above. The computer-readable medium can be stored on any suitable computer readable media such as RAMs, ROMs, flash memory, EEPROMs, optical devices (CD or DVD), hard drives, floppy drives, or any suitable device. The computer-executable component can be a processor but any suitable dedicated hardware device can (alternatively or additionally) execute the instructions.

As a person skilled in the art will recognize from the previous detailed description and from the figures and claims, modifications and changes can be made to the embodiments of the invention without departing from the scope of this invention as defined in the following claims.

We claim:

1. A method comprising:
   at a vehicle, during a first operating period:
   navigating within an agricultural field;
   capturing a first set of images of a set of target plants within the agricultural field, the set of target plants comprising a first individual target plant and a second individual target plant;
   capturing a first set of location data of the vehicle;
   executing a first agricultural operation on the first individual target plant, the first agricultural operation characterized by a first magnitude of the first agricultural operation and a first timestamp of the first agricultural operation; and
   executing a second agricultural operation on the second individual target plant, the second agricultural operation characterized by a second magnitude of the second agricultural operation and a second timestamp of the second agricultural operation;
   detecting a position of the first individual target plant in the first set of images;
   calculating a location of the first individual target plant based on the position of the first individual target plant in the first set of images and the first set of location data;
   generating a first plant profile of the first individual target plant associating the first individual target plant with a first unique identifier;
   extracting a first initial value of a plant metric characterizing the first individual target plant based on the first set of images;
   populating the first plant profile with:
   the location of the first individual target plant;
   the first initial value of the plant metric;
   the first magnitude of the first agricultural operation; and
   the first timestamp of the first agricultural operation;
   detecting a position of the second individual target plant in the first set of images;
   calculating a location of the second individual target plant based on the position of the second individual target plant in the first set of images and the first set of location data;
   generating a second plant profile of the second individual target plant associating the second individual target plant with a second unique identifier;
   extracting a second initial value of the plant metric characterizing the second individual target plant based on the first set of images;
   populating the second plant profile with:
   the location of the second individual target plant;
   the second initial value of the plant metric;
   the second magnitude of the second agricultural operation; and
   the second timestamp of the second agricultural operation;
   accessing a set of global condition data associated with the agricultural field and captured during a target time interval between the first operating period and a target time;
   predicting a first predicted value of the plant metric characterizing the first individual target plant at the target time based on:
   the first initial value of the plant metric;
   the first magnitude of the first agricultural operation;
   the first timestamp of the first agricultural operation; and
   the set of global condition data;
   populating the first plant profile with the first predicted value of the plant metric in association with the target time;
   predicting a second predicted value of the plant metric characterizing the second individual target plant at the target time based on:
   the second initial value of the plant metric;
   the second magnitude of the second agricultural operation;
   the second timestamp of the second agricultural operation; and the set of global condition data;
populating the second plant profile with the second predicted value of the plant metric in association with the target time; and
at the vehicle, during a second operating period at the target time:
  navigating within the agricultural field;
  capturing a second set of images of the set of target plants within the agricultural field;
  capturing a second set of location data of the vehicle;
  accessing the location of the first individual target plant and the first predicted value of the plant metric from the first plant profile;
  identifying the first individual target plant based on the second set of images, the second set of location data, and the location of the first individual target plant;
  executing a third agricultural operation on the first individual target plant based on the first predicted value of the plant metric;
  accessing the location of the second individual target plant and the second predicted value of the plant metric from the second plant profile;
  identifying the second individual target plant based on the second set of images, the second set of location data, and the location of the second individual target plant; and
  executing a fourth agricultural operation on the second individual target plant based on the second predicted value of the plant metric, the fourth agricultural operation different from the third agricultural operation.

2. The method of claim 1:
wherein detecting the position of the first individual target plant in the first set of images comprises:
  classifying the first individual target plant as a target plant species based on the first set of images; and
  identifying a stalk position of the first individual target plant based on the first set of images and the target plant species; and
wherein calculating the location of the first individual target plant based on the position of the first individual target plant in the first set of images and the first set of location data of the vehicle comprises calculating the location of the plant based on the stalk position of the first individual target plant in the first set of images and the first set of location data of the vehicle.

3. The method of claim 1:
wherein extracting the first initial value of the plant metric characterizing the first individual target plant based on the first set of images comprises:
  estimating a plant maturity of the first individual target plant based on a target plant species and the first set of images; and
  calculating an initial value of a root diameter metric of the first individual target plant and an initial value of a root depth metric characterizing the first individual target plant based on the plant maturity of the first individual target plant;
wherein populating the first plant profile with the location of the first individual target plant and the first initial value of the plant metric comprises populating the first plant profile with:
  the location of the first individual target plant;
  the initial value of the root diameter metric; and
  the initial value of the root depth metric;
wherein predicting the first predicted value of the plant metric characterizing the first individual target plant at the target time comprises:
  predicting a predicted value of the root diameter metric characterizing the first individual target plant at the target time based on the initial value of the root diameter metric and the set of global condition data; and
  predicting a predicted value of the root depth metric characterizing the first individual target plant at the target time based on the initial value of the root depth metric and the set of global condition data;
wherein populating the first plant profile with the first predicted value of the plant metric in association with the target time comprises:
  populating the first plant profile with the predicted value of the root diameter metric in association with the target time; and
  populating the first plant profile with the predicted value of the root depth metric in association with the target time; and
wherein executing the third agricultural operation on the first individual target plant based on the first predicted value of the plant metric comprises executing the third agricultural operation on the first individual target plant based on the predicted value of the root diameter metric and the predicted value of the root depth metric.

4. The method of claim 1:
wherein extracting the first initial value of the plant metric characterizing the first individual target plant based on the first set of images comprises:
  generating a three-dimensional model of the first individual target plant based on the first set of images; and
  calculating an initial value of a plant volume metric characterizing the first individual target plant based on the three-dimensional model;
wherein populating the first plant profile with the location of the first individual target plant and the first initial value of the plant metric comprises populating the first plant profile with the location of the first individual target plant and the initial value of the plant volume metric;
wherein predicting the first predicted value of the plant metric characterizing the first individual target plant at the target time comprises predicting a predicted value of the plant volume metric characterizing the first individual target plant at the target time based on the initial value of the plant volume metric and the set of global condition data;
wherein populating the first plant profile with the first predicted value of the plant metric in association with the target time comprises populating the first plant profile with the predicted value of the plant volume metric in association with the target time; and
wherein executing the third agricultural operation on the first individual target plant based on the first predicted value of the plant metric comprises executing the third agricultural operation on the first individual target plant based on the predicted value of the plant volume metric.

5. The method of claim 1:
wherein capturing the first set of images of the set of target plants within the agricultural field comprises capturing the first set of images of the set of target plants within the agricultural field, the first set of images comprising a first set of hyperspectral images;

wherein extracting the first initial value of the plant metric characterizing the first individual target plant based on the first set of images comprises extracting an initial value of a water content metric characterizing the first individual target plant based on the first set of hyperspectral images;

wherein populating the first plant profile with the location of the first individual target plant and the first initial value of the plant metric comprises populating the first plant profile with the location of the first individual target plant and the initial value of the water content metric;

wherein predicting the first predicted value of the plant metric characterizing the first individual target plant at the target time comprises predicting a predicted value of the water content metric characterizing the first individual target plant at the target time based on the initial value of the water content metric and the set of global condition data;

wherein populating the first plant profile with the first predicted value of the plant metric in association with the target time comprises populating the first plant profile with the predicted value of the water content metric in association with the target time; and wherein executing the third agricultural operation on the first individual target plant based on the first predicted value of the plant metric comprises executing the third agricultural operation on the first individual target plant based on the predicted value of the water content metric.

6. The method of claim 1:

wherein extracting the first initial value of the plant metric characterizing the first individual target plant based on the first set of images comprises extracting an initial value of a disease pressure metric characterizing the first individual target plant based on the first set of images;

wherein populating the first plant profile with the location of the first individual target plant and the first initial value of the plant metric comprises populating the first plant profile with the location of the first individual target plant and the initial value of the disease pressure metric;

wherein predicting the first predicted value of the plant metric characterizing the first individual target plant at the target time comprises predicting a predicted value of the disease pressure metric characterizing the first individual target plant at the target time based on the initial value of the disease pressure metric and the set of global condition data;

wherein populating the first plant profile with the first predicted value of the plant metric in association with the target time comprises populating the first plant profile with the predicted value of the disease pressure metric in association with the target time; and wherein executing the third agricultural operation on the first individual target plant based on the first predicted value of the plant metric comprises executing the third agricultural operation on the first individual target plant based on the predicted value of the disease pressure metric.

7. The method of claim 1:

further comprising:

at the vehicle, capturing a first set of local condition data, each local condition data point in the set of local condition data associated with a subregion of the agricultural field; and populating the first plant profile with an adjacent local condition data point of the first individual target plant from the set of local condition data based on an adjacent region associated with the adjacent local data point, the adjacent region encompassing the location of the first individual target plant; and wherein predicting the first predicted value of the plant metric characterizing the first individual target plant at the target time comprises predicting the first predicted value of the plant metric characterizing the first individual target plant at the target time based on the first initial value of the plant metric, the set of global condition data, and the adjacent local condition data point.

8. The method of claim 7:

wherein populating the first plant profile with the adjacent local condition data point comprises appending the adjacent local condition data point to a time series of adjacent local condition data of the first individual target plant captured during a series of prior operating periods;

further comprising:

accessing a set of prior global condition data associated with the agricultural field and concurrent with the series of prior operating periods;

correlating the time series of adjacent local condition data with the set of prior global condition data to generate a local condition model; and predicting a time series of local condition data for the target time interval between the first operating period and the target time based on the local condition model and the set of global condition data; and wherein predicting the first predicted value of the plant metric characterizing the first individual target plant at the target time comprises predicting the first predicted value of the plant metric characterizing the first individual target plant at the target time based on the first initial value of the plant metric and the time series of local condition data.

9. The method of claim 1:

wherein accessing the set of global condition data associated with the agricultural field and captured during the target time interval comprises accessing a series of satellite images of the agricultural field captured during the target time interval; and wherein predicting the first predicted value of the plant metric characterizing the first individual target plant at the target time comprises predicting the first predicted value of the plant metric at the target time based on the first initial value of the plant metric and the series of satellite images of the agricultural field.

10. The method of claim 1:

wherein accessing the set of global condition data associated with the agricultural field and captured during the target time interval comprises accessing a set of weather data associated with the agricultural field captured during the target time interval; and wherein predicting the first predicted value of the plant metric characterizing the first individual target plant at the target time comprises predicting the first predicted value of the plant metric at the target time based on the first initial value of the plant metric and the set of weather data associated with the agricultural field.

11. The method of claim 1, further comprising:
at the vehicle, during the second operating period capturing a set of operation data associated with the third agricultural operation executed on the first individual target plant; and
populating the first plant profile with the set of operation data associated with the third agricultural operation executed on the first individual target plant.

12. The method of claim 1:
further comprising:
prior to the target time, generating an agricultural operation plan for the first individual target plant based on the first predicted value of the plant metric; and
at the vehicle and during the second operating period:
accessing the agricultural operation plan for the first individual target plant;
in response to identifying the first individual target plant based on the second set of images, calculating an adjusted value of the plant metric based on the second set of images; and
adjusting the third agricultural operation plan for the first individual target plant based on the adjusted value of the plant metric to generate an adjusted agricultural operation plan for the first individual target plant; and
wherein executing the third agricultural operation on the first individual target plant based on the first predicted value of the plant metric comprises executing the third agricultural operation on the first individual target plant in accordance with the adjusted agricultural operation plan.

13. The method of claim 1, further comprising, at the vehicle, during the second operating period:
in response to identifying the first individual target plant based on the second set of images, calculating an adjusted value of the plant metric characterizing the first individual target plant based on the second set of images; and
detecting an anomaly associated with the first individual target plant based on a difference between the adjusted value of the plant metric and the first predicted value of the plant metric.

14. The method of claim 1, wherein executing the third agricultural operation on the first individual target plant based on the first predicted value of the plant metric comprises:
setting a maximum blade gap for a weeding operation on the first individual target plant based on the first predicted value of the plant metric; and
executing the weeding operation on the first individual target plant in accordance with the maximum blade gap.

15. The method of claim 1, wherein executing the third agricultural operation on the first individual target plant based on the first predicted value of the plant metric comprises:
generating a harvesting designation based on the first predicted value of the plant metric; and
in response to the harvesting designation indicating that the first individual target plant is designated for harvesting, executing a harvesting operation on the first individual target plant.

16. The method of claim 1, wherein executing the third agricultural operation on the first individual target plant based on the first predicted value of the plant metric comprises:
calculating a fertilizer quantity based on the first predicted value of the plant metric; and
dispensing the fertilizer quantity at the location of the first individual target plant.

17. The method of claim 1, wherein executing the third agricultural operation on the first individual target plant based on the first predicted value of the plant metric comprises:
calculating a pesticide quantity based on the first predicted value of the plant metric; and
dispensing the pesticide quantity at the location of the first individual target plant.

18. The method of claim 1, wherein executing the third agricultural operation on the first individual target plant based on the first predicted value of the plant metric comprises:
calculating a water quantity based on the first predicted value of the plant metric; and
dispensing the water quantity at the location of the first individual target plant.

* * * * *